(12) United States Patent  (10) Patent No.: US 7,701,594 B2
Shiraishi  (45) Date of Patent: Apr. 20, 2010

(54) IMAGE FORMING APPARATUS, IMAGE FORMING METHOD, AND COMPUTER PRODUCT

(75) Inventor: Naoto Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1516 days.

(21) Appl. No.: 10/942,904

(22) Filed: Sep. 17, 2004

(65) Prior Publication Data

US 2005/0062994 A1 Mar. 24, 2005

(30) Foreign Application Priority Data

Sep. 18, 2003 (JP) ............... 2003-326536

(51) Int. Cl.
G06F 3/12 (2006.01)
(52) U.S. Cl. ............... 358/1.13; 358/1.9; 358/530
(58) Field of Classification Search ............. 358/1.1, 358/1.9, 530, 3, 3.27–3.32, 500, 443, 160, 358/81; 345/589–590, 502, 423, 419, 420
See application file for complete search history.

(56) References Cited

U.S. PATENT DOCUMENTS

| | | | |
|---|---|---|---|
| 5,237,517 A * | 8/1993 | Harrington et al. .......... 382/162 |
| 5,337,168 A | 8/1994 | Fujii et al. | |
| 5,341,468 A | 8/1994 | Shiraishi et al. | |
| 5,349,610 A | 9/1994 | Sakamoto et al. | |
| 5,396,585 A | 3/1995 | Fujii et al. | |
| 5,448,690 A | 9/1995 | Shiraishi et al. | |
| 5,455,900 A | 10/1995 | Shiraishi et al. | |
| 5,459,822 A | 10/1995 | Izawa et al. | |
| 5,465,371 A | 11/1995 | Fujii et al. | |
| 5,502,802 A | 3/1996 | Shiraishi | |
| 5,551,019 A | 8/1996 | Izawa et al. | |
| 5,732,204 A | 3/1998 | Fukushima et al. | |
| 5,739,826 A | 4/1998 | Shiraishi et al. | |
| 5,828,378 A | 10/1998 | Shiraishi | |
| 5,859,650 A | 1/1999 | Shiraishi | |
| 5,903,276 A | 5/1999 | Shiraishi | |
| 6,081,274 A | 6/2000 | Shiraishi | |
| 6,172,678 B1 | 1/2001 | Shiraishi | |
| 6,184,903 B1 | 2/2001 | Omori | |
| 6,208,347 B1 * | 3/2001 | Migdal et al. ............... 345/419 |

(Continued)

FOREIGN PATENT DOCUMENTS

JP 7-168679 7/1995

(Continued)

*Primary Examiner*—King Y Poon
*Assistant Examiner*—Iriana Cruz
(74) *Attorney, Agent, or Firm*—Oblon, Spivak, McClelland, Maier & Neustadt, L.L.P.

(57) ABSTRACT

An image forming apparatus includes a rendering processing unit that represents position information of each vertex of a plurality of triangles forming a figure in a first image data with coordinate values in a first axis in a depth direction, a second axis perpendicular to the first axis, and a third axis perpendicular to both the first axis and the second axis, obtains the position information and color information on each vertex of the triangles, and performs the rendering process on the first image data to produce a second image data, a hidden-surface processing unit that performs a hidden-surface process on the second image data to produce a third image data, and an image processing unit that performs an image process on the third image data.

14 Claims, 39 Drawing Sheets

U.S. PATENT DOCUMENTS 6,704,018 B1 * 3/2004 Mori et al. .................. 345/502

FOREIGN PATENT DOCUMENTS

| | | |
|---|---|---|
| JP | 7-287774 | 10/1995 |
| JP | 9-171564 | 6/1997 |
| JP | 10-188004 | 7/1998 |
| JP | 2001-357409 | 12/2001 |

* cited by examiner

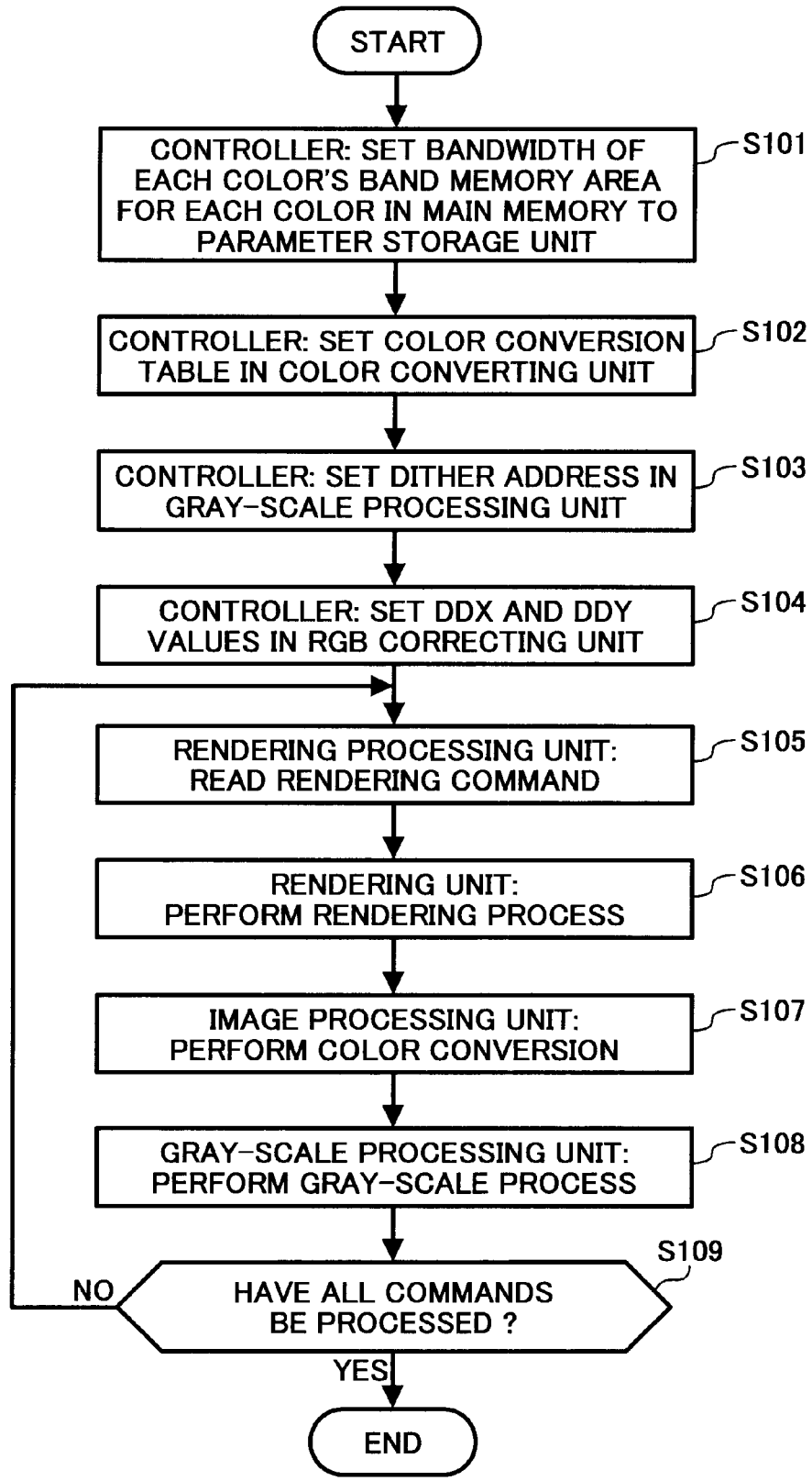

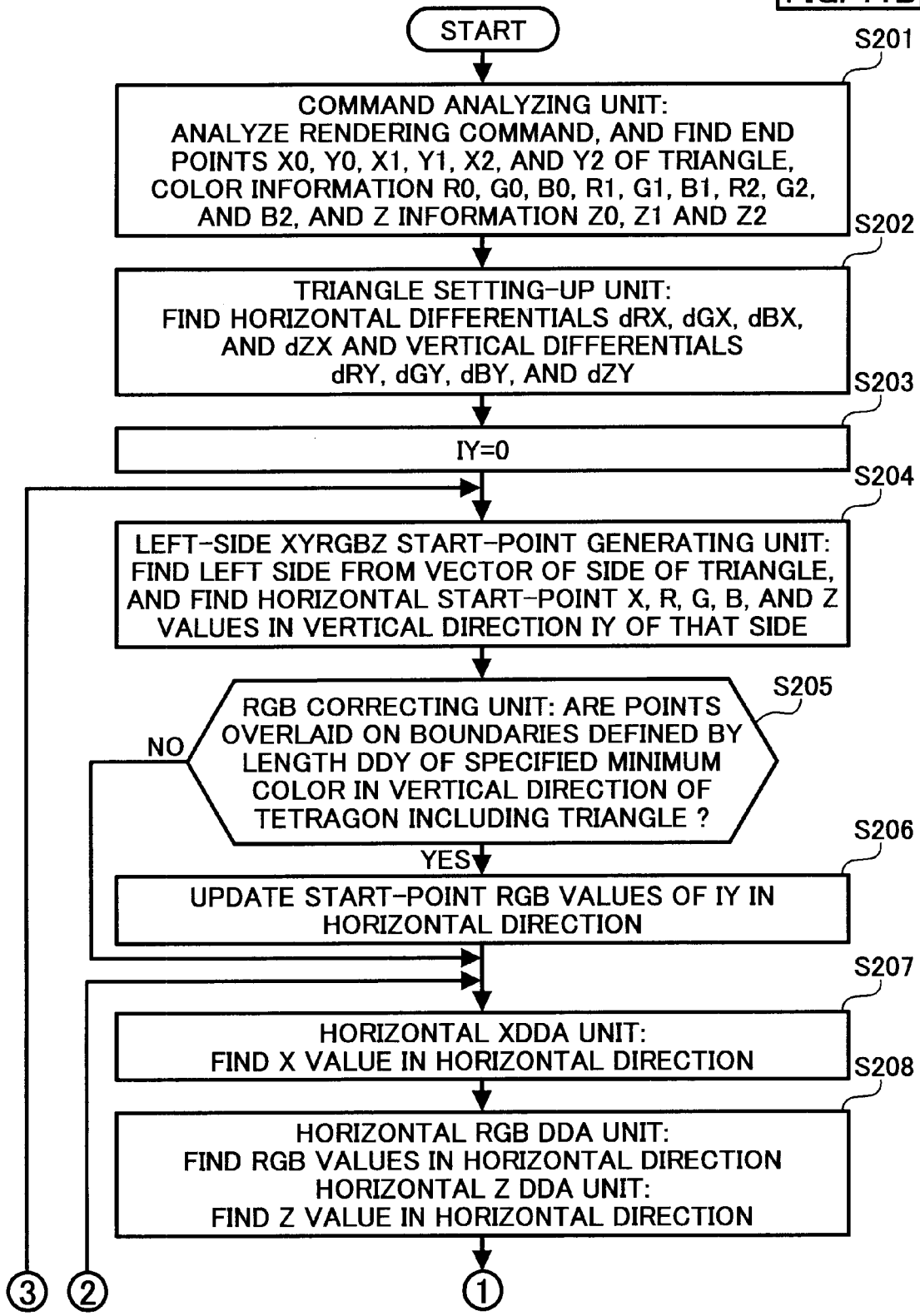

EXAMPLE OF CALCULATION OF LEFT SIDE

●EXAMPLE OF TRIANGLE GRADIENT FILL

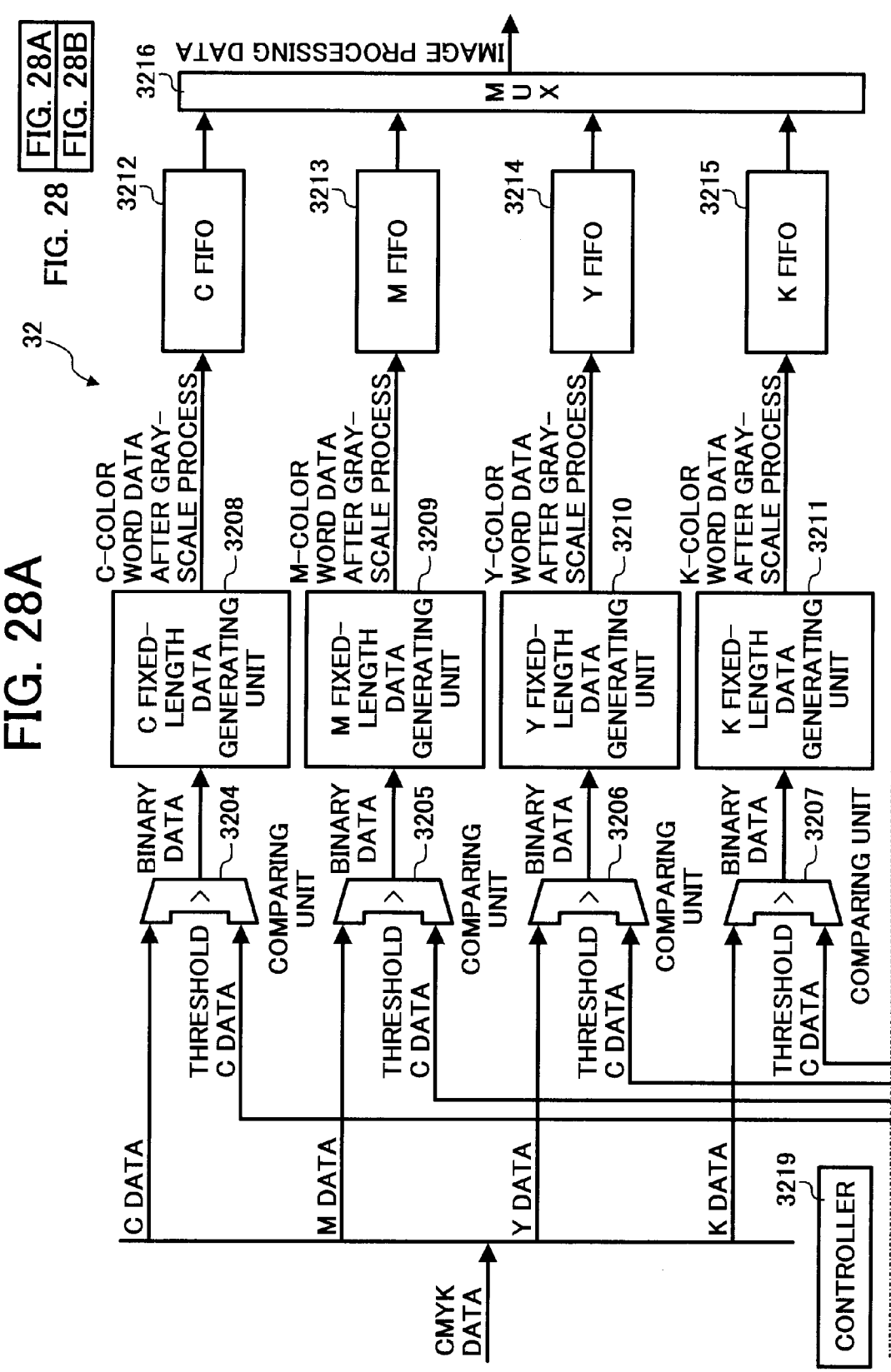

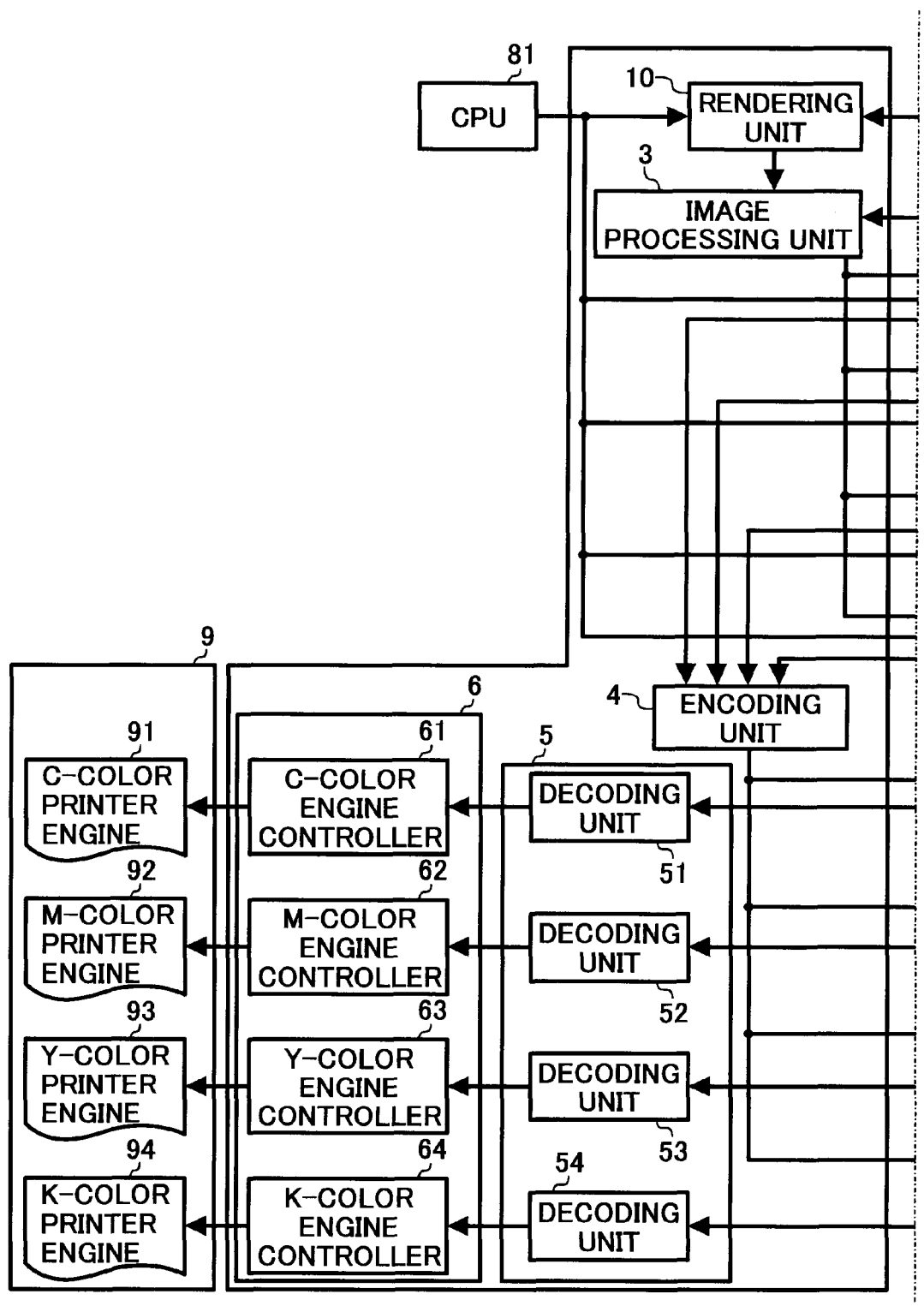

IMAGE FORMING APPARATUS, IMAGE FORMING METHOD, AND COMPUTER PRODUCT

CROSS-REFERENCE TO RELATED APPLICATIONS

The present document incorporates by reference the entire contents of Japanese priority document, 2003-326536 filed in Japan Sep. 18, 2003.

BACKGROUND OF THE INVENTION

1) Field of the Invention

The present invention relates to a technology for performing a rendering process and an image processing on three-dimensional graphic data.

2) Description of the Related Art

In recent years, color desktop publishing (DTP) processors and word processors include highly-functional applications, thereby making it possible to create not only text but also complex graphics. Among others, a gradation function for successively changing color density is widely used for enhancing the appearance of documents. For example, GDI+® is known as a graphic application programming interface (API) for WINDOWS® 2000, which is an operation system dedicated to personal computers and manufactured by Microsoft Corporation. A gradient fill of this GDI+® defines, as shown in FIG. 33, three end points of a triangle with each different color, and interpolates inside of each point for rendering.

Also, in Power Point®, which is a presentation software program manufactured by Microsoft Corporation, two-dimensional graphics and photo images are pasted for creating documents for presentation.

Conventionally, pasting three-dimensional graphic data on a presentation document or the like is performed after the three-dimensional graphic data is converted to two-dimensional image data.

As for three-dimensional (3D) processing, a scheme is known in which end points of a triangle polygon are assigned with RGB colors and then interpolation is performed based on a plane equation.

In Power Point® of Microsoft Corporation, examples of an image to be pasted are two-dimensional bit map data and two-dimensional graphics. As for two-dimensional bit map data, due to a difference in resolution between a cathode-ray tube (CRT) and a printer, the image is disadvantageously degraded when printed out with a zoom-in process.

On the other hand, two-dimensional graphics allow zoom-in and zoom-out, and therefore no image degradation occurs due to zoom-in. However, two-dimensional graphics are not as realistic as photo images. Also, a two-dimensional graphic is merely a figure viewed from one direction. To get a figure viewed from another direction, another figure has to be rendered.

The problems described above at the time of using two-dimensional graphics can be solved by pasting three-dimensional graphic data. Three-dimensional graphic data allows zoom-in and zoom-out, and no image degradation occurs due to zoom-in. Also, three-dimensional graphics are realistic as photo images. Furthermore, the three-dimensional graphics can be rotatably pasted, thereby making it possible to freely generate two-dimensional images with different view points.

However, when three-dimensional graphic data is pasted during a rendering process with a gradient fill of GDI+®, for example, such rendering is merely two-dimensional rendering. Therefore, in rendering three-dimensional graphic data, a hidden-surface process cannot be performed and therefore, disadvantageously, a clear and realistic image cannot be generated.

The hidden-surface process is described below. FIG. 34A is a diagram for explaining an example of the hidden-surface process. Here, two three-dimensional triangles are provided at their end points with Z values, and the hidden-surface process is performed through the known Z buffer scheme, for example. When the hidden-surface process is accurately performed, as shown in the drawing, in a three-dimensional point of view, one triangle is penetrated by the other triangle. FIG. 34B is a diagram for explaining an example of a rendering process without a hidden-surface process. In this case, a figure in which one triangle is not penetrated by the other triangle, which is different from a figure actually viewed, is rendered.

FIG. 34C is a diagram for explaining another example of the rendering process without a hidden-surface process. In this example, one three-dimensional triangle is divided into two figures to be displayed for rendering. FIG. 34D is a diagram for explaining still another example of the rendering process without a hidden-surface process so that a stereoscopic positional relation between the two triangles is made clear. In this example, three figures are rendered. With this, a process of obtaining a figure to be displayed becomes complex, and an image processing time is increased.

Moreover, at the time of forming an image, such as at the time of actual printing, a scheme can be taken in which a three-dimensional graphic process is performed typically by a host personal computer on three-dimensional graphic data in print data, and after the three-dimensional graphic data is converted to two-dimensional data, the data is transferred to a printer. In this case, however, communication data and a communication time are increased. Also, due to a difference between a resolution of a host personal computer and a low resolution of the printer, an aliasing becomes conspicuous when the data is actually printed out, resulting in low image quality.

To solve these conventional problems, a printing apparatus has been published in which a rendering process is performed in the printing apparatus so that print data including three-dimensional image information received from a host is changed to a three-dimensional graphic for print-out, thereby reducing a load on data communications and achieving a high-speed process (see, for example, Japanese Patent Laid-Open Publication No. 07-168679).

This printing apparatus uses a scheme in which projection conversion is performed by the printing apparatus itself for converting three-dimensional graphic data to two-dimensional data for rendering.

According to the patent document mentioned above, a decision regarding a back side is made to a convex figure, such as a simple hexahedron, and then projection conversion is performed, thereby making it possible to render approximately accurate figure. However, the patent document does not mention a hidden-surface process required for normal three-dimensional graphic data. In practice, without such a hidden-surface process, an accurate figure cannot be rendered.

Furthermore, conventionally, the Z buffer scheme is known as a hidden-surface process. Currently, however, printers are typically at a resolution of 120 dots per inch (dpi), which requires a memory amount that is several tens of times as large as a memory amount of a CRT at a resolution of 72 dpi. Therefore, it is generally not an easy task for the printer to perform a hidden-surface process.

SUMMARY OF THE INVENTION

It is an object of the present invention to solve at least the above problems in the conventional technology.

An image forming apparatus according to one aspect of the present invention includes a rendering processing unit that represents position information of each vertex of a plurality of triangles forming a figure in a first image data with coordinate values in a first axis in a depth direction, a second axis in a first direction perpendicular to the first axis, and a third axis in a second direction perpendicular to both the first axis and the second axis, obtains the position information and color information on each vertex of the triangles, and performs the rendering process on the first image data to produce a second image data; a hidden-surface processing unit that performs a hidden-surface process on the second image data to produce a third image data; and an image processing unit that performs an image procession the third image data.

An image forming method according to another aspect of the present invention includes obtaining position information of each vertex of a plurality of triangles forming a figure in a first image data; performing a rendering process on the first image data to produce a second image data; performing a hidden-surface process on the second image data to produce a third image data; and performing an image process on the third image data.

A computer-readable recoding medium according to still another aspect of the present invention stores a computer program for realizing the image forming method according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a flowchart of a rendering process to be performed by the image forming apparatus according to the embodiment;

DETAILED DESCRIPTION

Exemplary embodiments of an image forming apparatus, an image forming method, and a computer product according to the present invention are explained in detail with reference to the accompanying drawings.

Figure 1A:
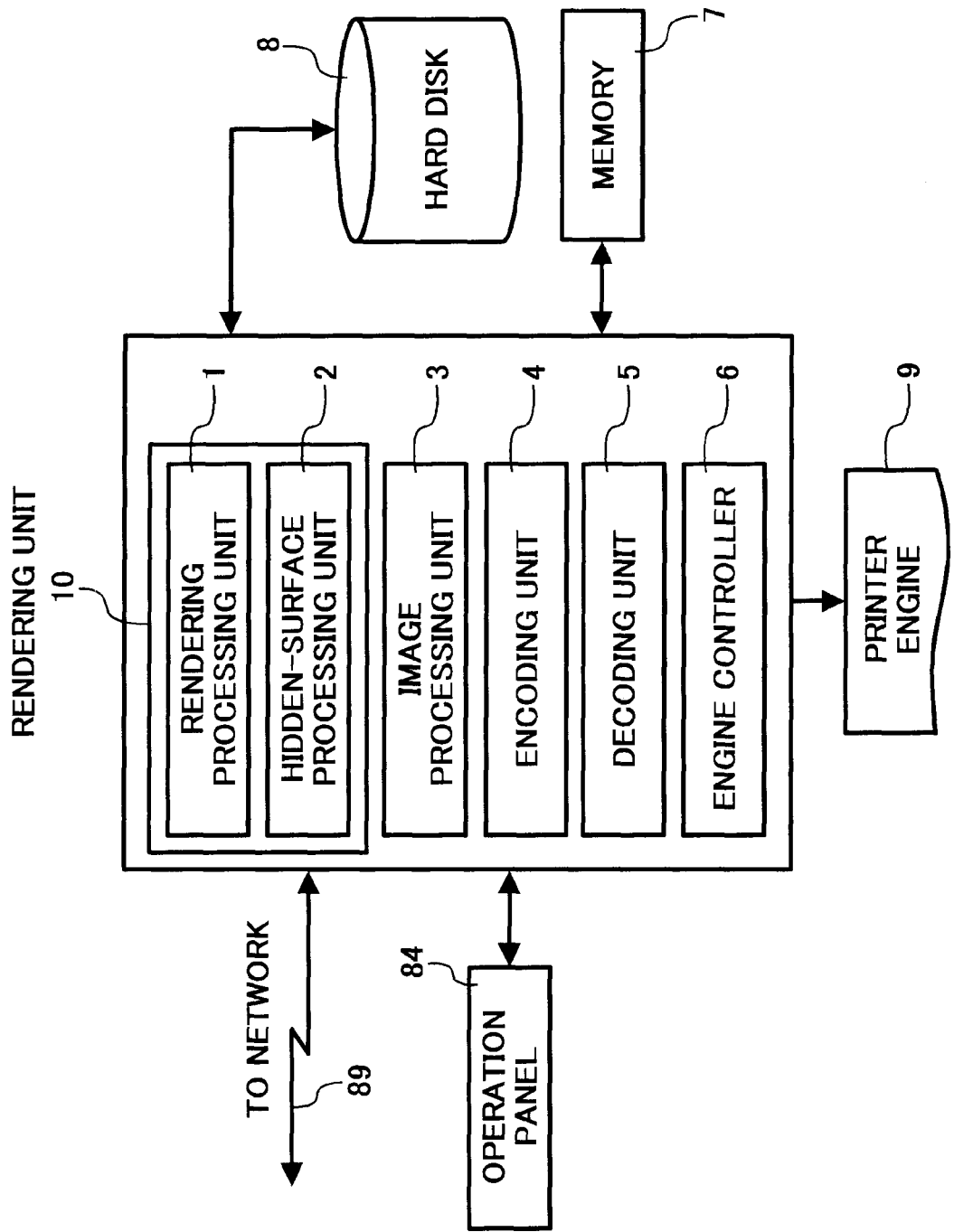
FIG. 1A is a functional block diagram of an image forming apparatus according to an embodiment of the present invention.
Figure 1B:
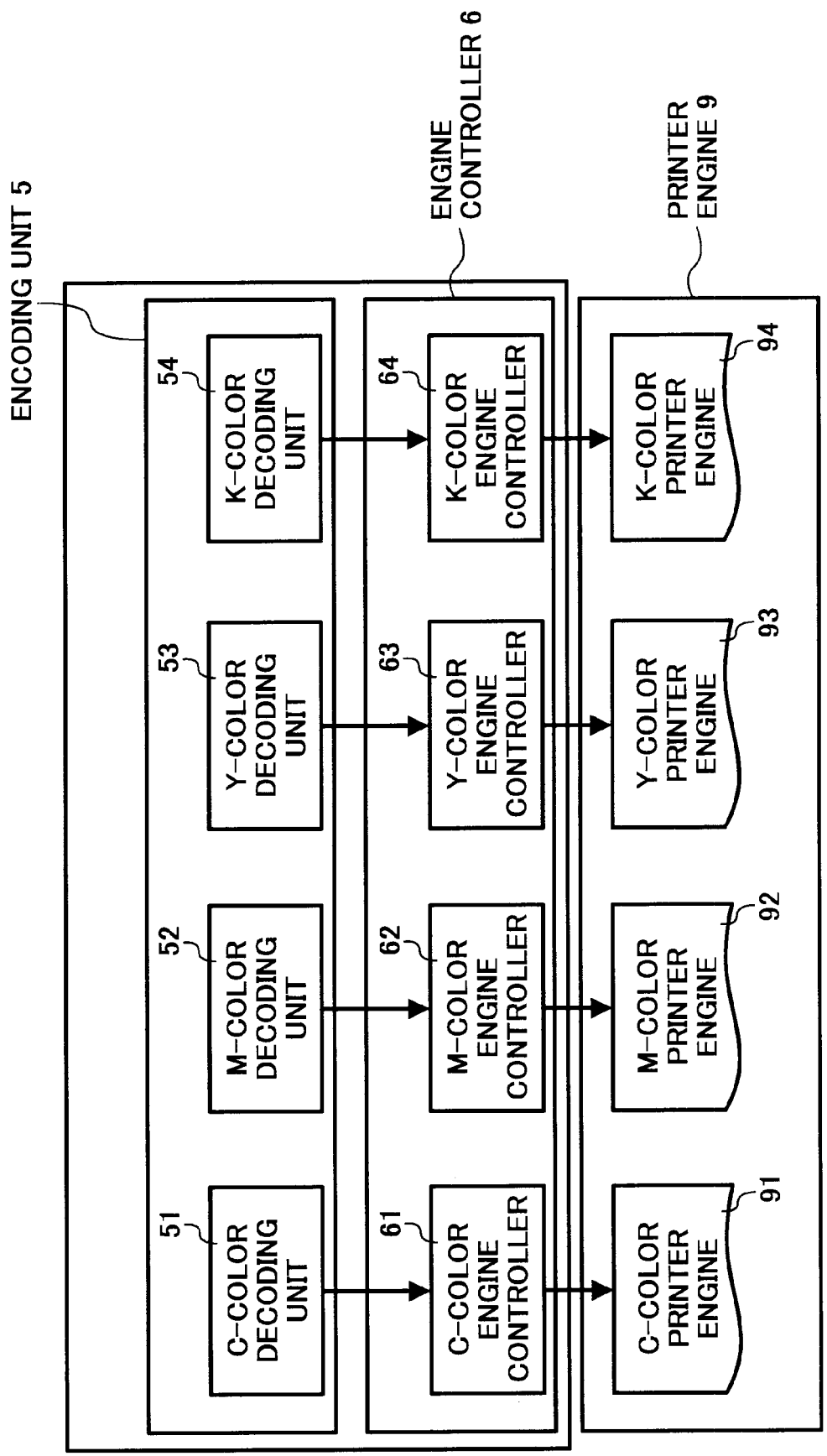
FIG. 1B is a partial block diagram of the image forming apparatus according to the embodiment.
Figure 2:
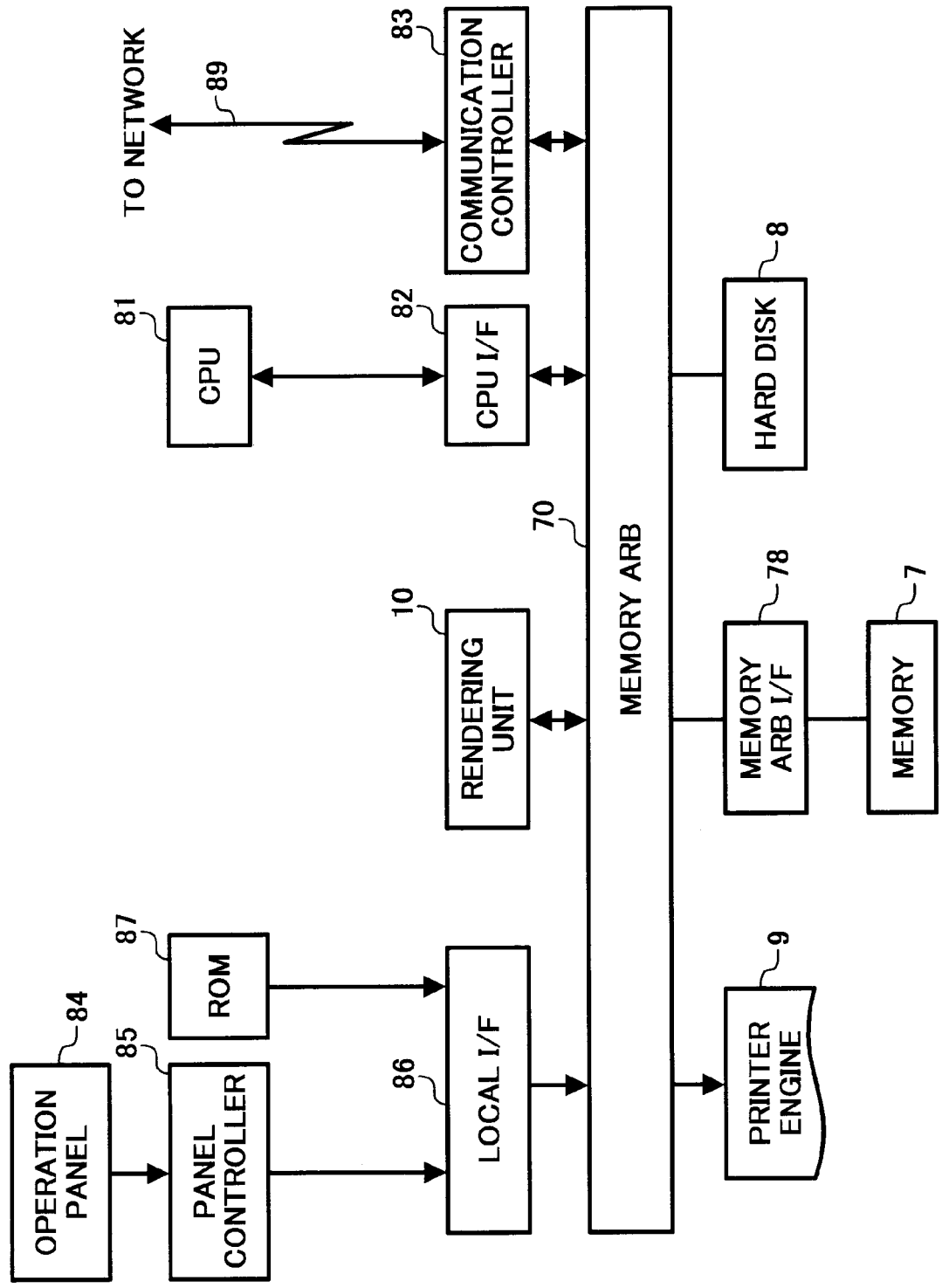
FIG. 2 is a diagram of a hardware structure of the image forming apparatus according to the embodiment.

FIG. 1A is a functional block diagram of an image forming apparatus according to an embodiment of the present invention. FIG. 1B is a partial block diagram of the image forming apparatus according to the embodiment. FIG. 2 is a diagram of a hardware structure of the image forming apparatus according to the embodiment. With reference to FIGS. 1A, 1B, and 2, the entire structure of the image forming apparatus is described.

As shown in FIG. 1A, the image forming apparatus includes a rendering processing unit 1, a hidden-surface processing unit 2, an image processing unit 3, an encoding unit 4, a decoding unit 5, and an engine controller 6.

The rendering processing unit 1 performs rendering by configuring a figure with a plurality of triangles based on image data received through a network 89. The rendering processing unit 1 receives a rendering command from a CPU 81, and then calculates Z values sequentially in a horizontal direction.

The hidden-surface processing unit 2 reads the Z values calculated by the rendering processing unit 1 from the Z values in a Z buffer (which will be described further below) of a main memory 7 to perform a hidden-surface process, and then finds color information (RGB) values and memory addresses of band memories for rendering. Then, the hidden-surface processing unit 2 transfers the found values and addresses to the image processing unit 3. Here, the rendering processing unit 1 and the hidden-surface processing unit 2 are collectively referred to as a rendering processing unit 10.

The image processing unit 3 receives the addresses and the color information (RGB) values from the rendering processing unit 1 to perform an image process, and then stores the process results in a band memory area (which will be described further below) of the main memory 7.

The encoding unit 4 encodes the band data of the main memory 7, and then transfers the encoded band data to an encoded page memory area (which will be described further below) of the main memory 7.

The decoding unit 5 receives the encoded data of each color of cyan (C), magenta (M), yellow (Y), and K (black) encoded by the encoding unit 4 and, as shown in FIG. 1B, decodes the encoded data in decoding units 51 through 54 for the respective colors for transfer to engine controllers 61 through 64 for the respective colors. The C-color, M-color, Y-color, and K-color engine controllers 61 through 64 receive the image data from the respective decoding units 51 through 54 for transfer to the printer engines 91 through 94 for the respective colors.

Here, the image processing unit 3, the encoding unit 4, and the decoding unit 5 form an image processing unit according to the present invention.

The central processing unit (CPU) 81 controls the entirety of a printer apparatus. A CPU interface (I/F) 82 of the CPU 81 is connected to a memory arbiter (a memory ARB 70) 70 for interfacing between the CPU 81 and the memory ARB 70 (FIG. 2).

The memory ARB 70 controls the main memory (which may be hereinafter referred to simply as memory) 7 through a memory ARB I/F 78. The memory ARB 70 controls the memory 7, the CPU 81, a local I/F 86, the decoding unit 5, the rendering unit 1, the image processing unit 3, and the encoding unit 4.

The local I/F 86 is an I/F for a local bus, and interfaces among a ROM 87, a panel controller 85, the CPU 81, and the memory 7. A communication controller 83 is connected to the network 89 for receiving various data and commands from the network 89, and is also connected to various controllers via the memory ARB 70.

The ROM 87 stores font information, such as characters, programs for the CPU 81, and other data. The panel controller 85 controls an operation panel 84. The operation panel 84 detects an input of an operation from the user, and transmits the detected input signal via the panel controller 85 to the relevant component(s) of the image forming apparatus.

The main memory 7 stores encoded data of the encoding unit 4, the programs in the CPU 81, font data, and various data regarding band memory and Z buffer.

Figure 3:
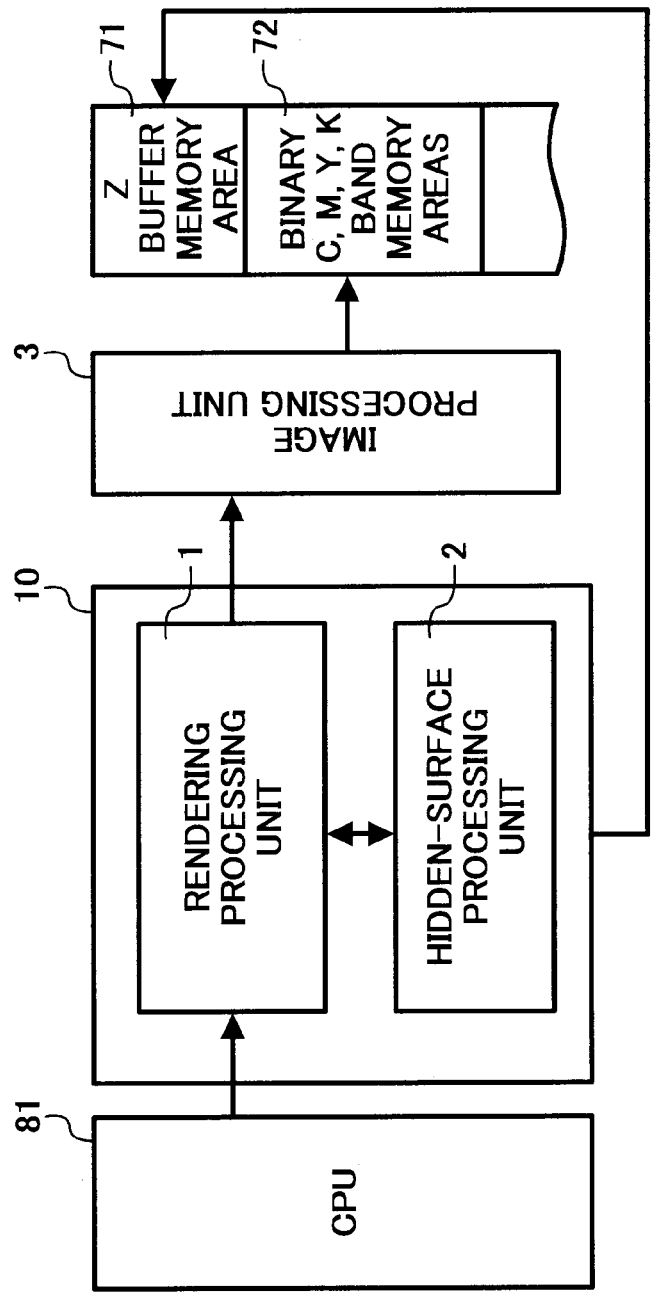
FIG. 3 is a diagram for explaining a main flow of data of the image forming apparatus according to the embodiment.

FIG. 3 is a diagram for explaining a main flow of data in the image forming apparatus according to the embodiment. A rendering command is generated by the CPU 81 and is then transferred to the rendering processing unit 1. The rendering processing unit 1 calculates Z values sequentially from a vertical direction of a figure to a horizontal direction to read the Z values of the Z buffer. The hidden-surface processing unit 2 performs a hidden-surface process by using the calculated Z values, and finds color information (RGB) values and the memory addresses of the band memory for rendering. The hidden-surface processing unit 2 then transfers the found values and addresses to the image processing unit 3. The image processing unit 3 performs an image process to store the results in a binary band memory area 72 for the respective colors in the main memory 7.

Figure 4A:
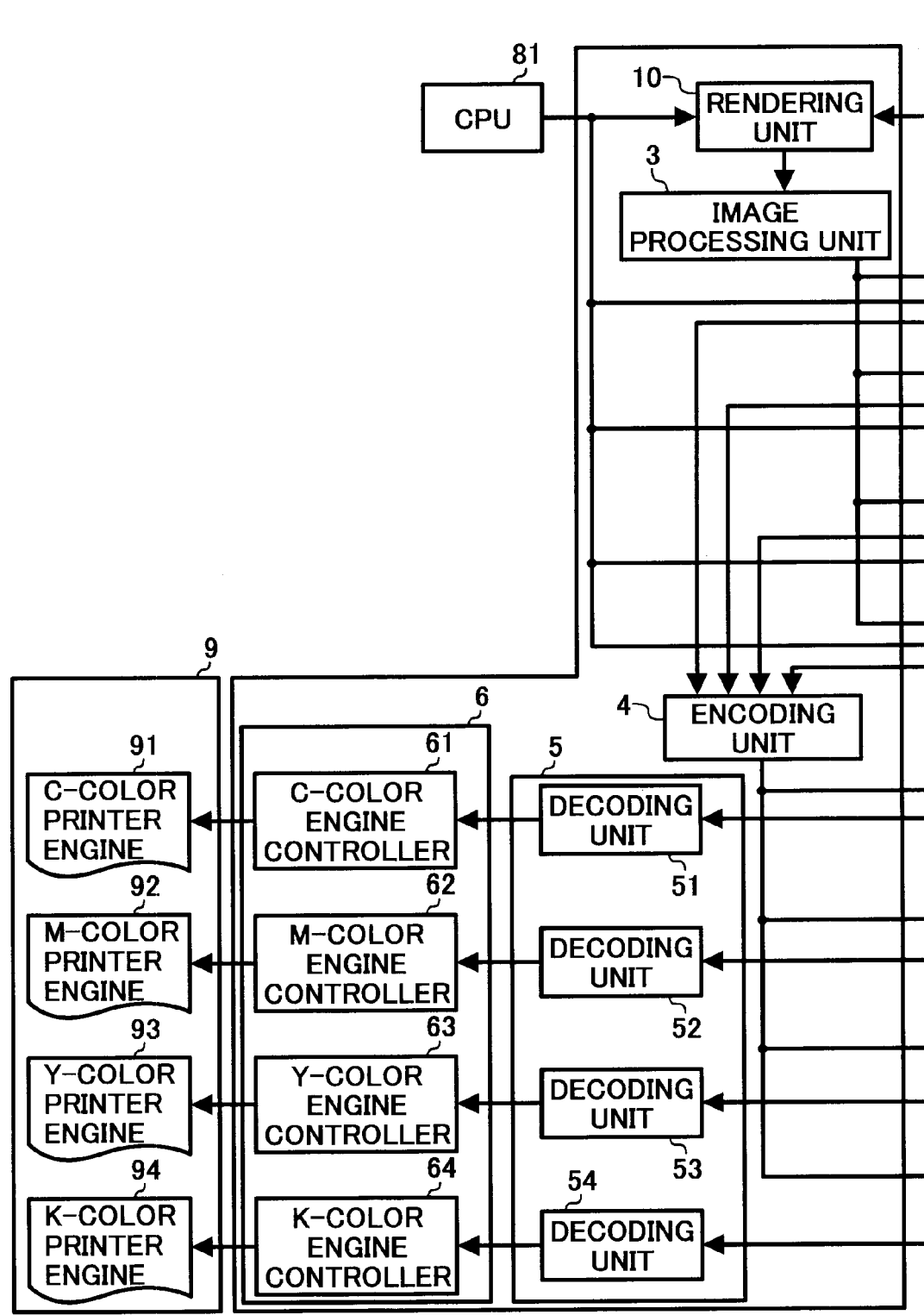
FIG. 4 is a diagram of data transmission and reception among components and memories in the image forming apparatus according to the embodiment.
Figure 4B:
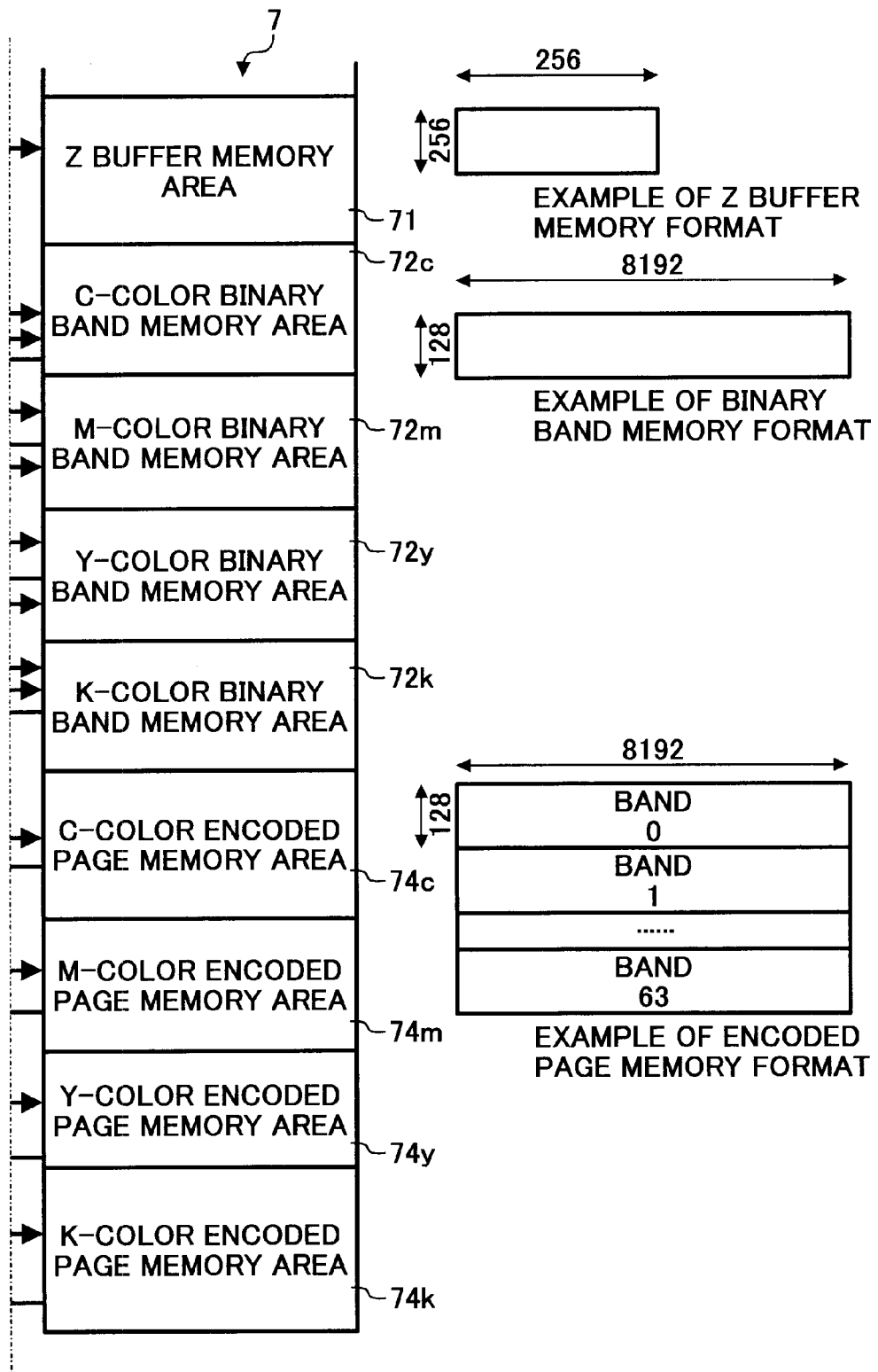

FIG. 4 is a diagram of data transmission and reception among the components and the memories in the image forming apparatus according to the embodiment. The rendering processing unit 1 receives a rendering command from the CPU 81, analyzes the command, and then renders a 3D graphic figure. The hidden-surface processing unit 2 in the rendering unit 10 finds addresses on a Z buffer memory storage area 71 sequentially in the horizontal direction, performs a hidden-surface process, and then transfers the addresses on the band memories and color information (RGB) sequentially to the image processing unit 3.

The image processing unit 3 receives an origin address of a band of each color and a threshold size from the CPU 81 and the memory addresses and the color information (RGB) from the rendering processing unit 1 to perform a color converting process for conversion to CMYK values, and then generates band data after a gray-scale process in each color's band memory. The main memory 7 stores, for example, encoded data on a page for each color, Z buffer data, and the band data after the gray-scale process.

The encoding unit 4 encodes the band data after a gray-scale process for each color, and then transfers the band data to page encoded memory areas 74c, 74m, 74y and 74k in the memory 7 for the respective colors.

The decoding unit 5 reads and decodes codes required for each color sequentially from the main memory 7 in synchronization with printer engines 91, 92, 93, and 94 for the respective colors, and then transfers the decoded codes to engine controllers 61, 62, 63, and 64 for the respective colors.

The engine controllers 61, 62, 63, and 64 for the respective colors receive the codes from the decoding units 51, 52, 53, and 54 for the respective colors for controlling the printer engines for the respective colors.

Figure 5:
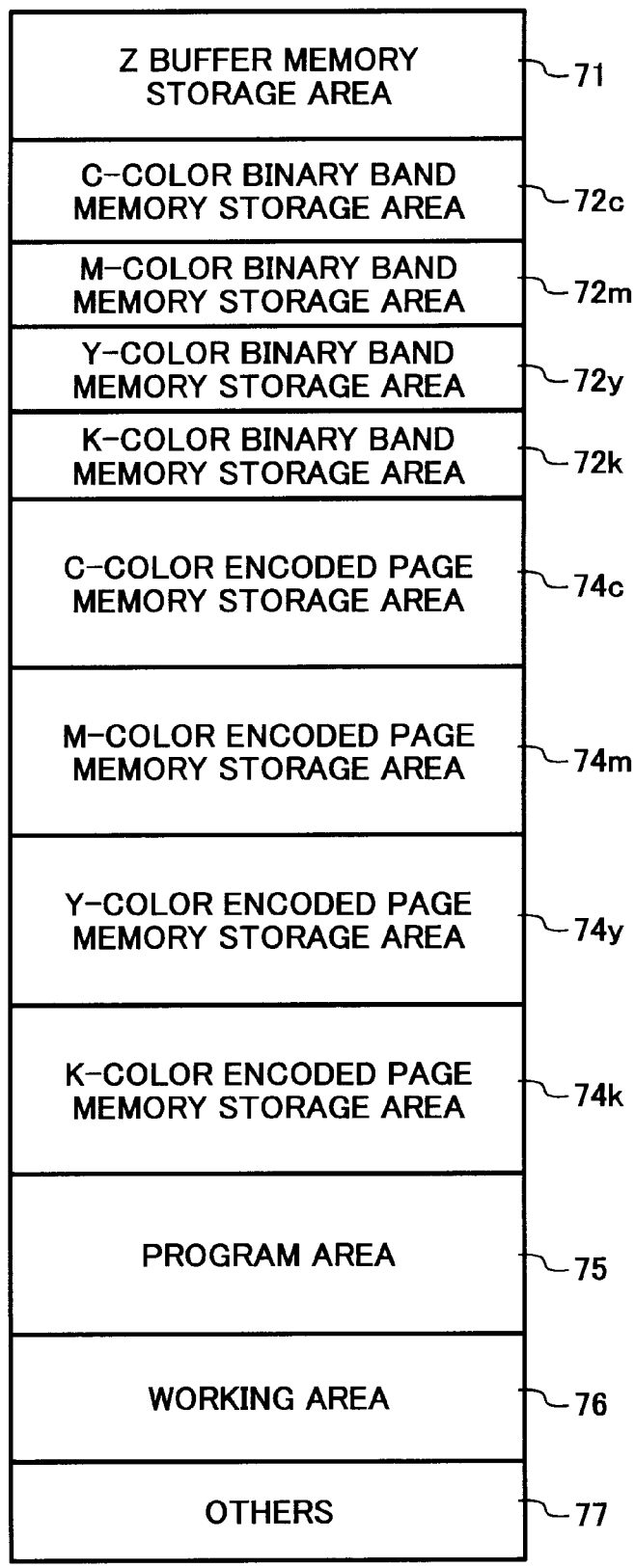
FIG. 5 is a diagram of an example of a format of a main memory in the image forming apparatus according to the embodiment.

FIG. 5 is a diagram of one example of a format of a main memory in the image forming apparatus according to the embodiment.

The Z buffer memory storage area 71 is an area for storing a Z-buffer memory required for a hidden-surface process at the time of a 3D rendering process. C-color, M-color, Y-color, and K-color binary band memory storage areas 72c, 72m, 72y, and 72k store a plurality of pieces of binary, quaternary, and hexadecimal band information after being subjected to an image process for the respective colors.

The binary band memory area 72c, 72m, 72y, and 72k form an image-processing-data storage unit.

A C-color encoded page memory area 74c is an area for storing encoded C-color data for each band after the gray-scale process for a plurality of pages. An M-color encoded page memory area 74m is an area for storing encoded M-color data for each band after the gray-scale process for a plurality of pages. A Y-color encoded page memory area 74y is an area for storing encoded Y-color data for each band after the gray-scale process for a plurality of pages. A K-color encoded page memory area 74k is an area for storing encoded K-color data for each band after the gray-scale process for a plurality of pages. A program area 75 is an area for storing various programs for the CPU 81.

Figure 6:
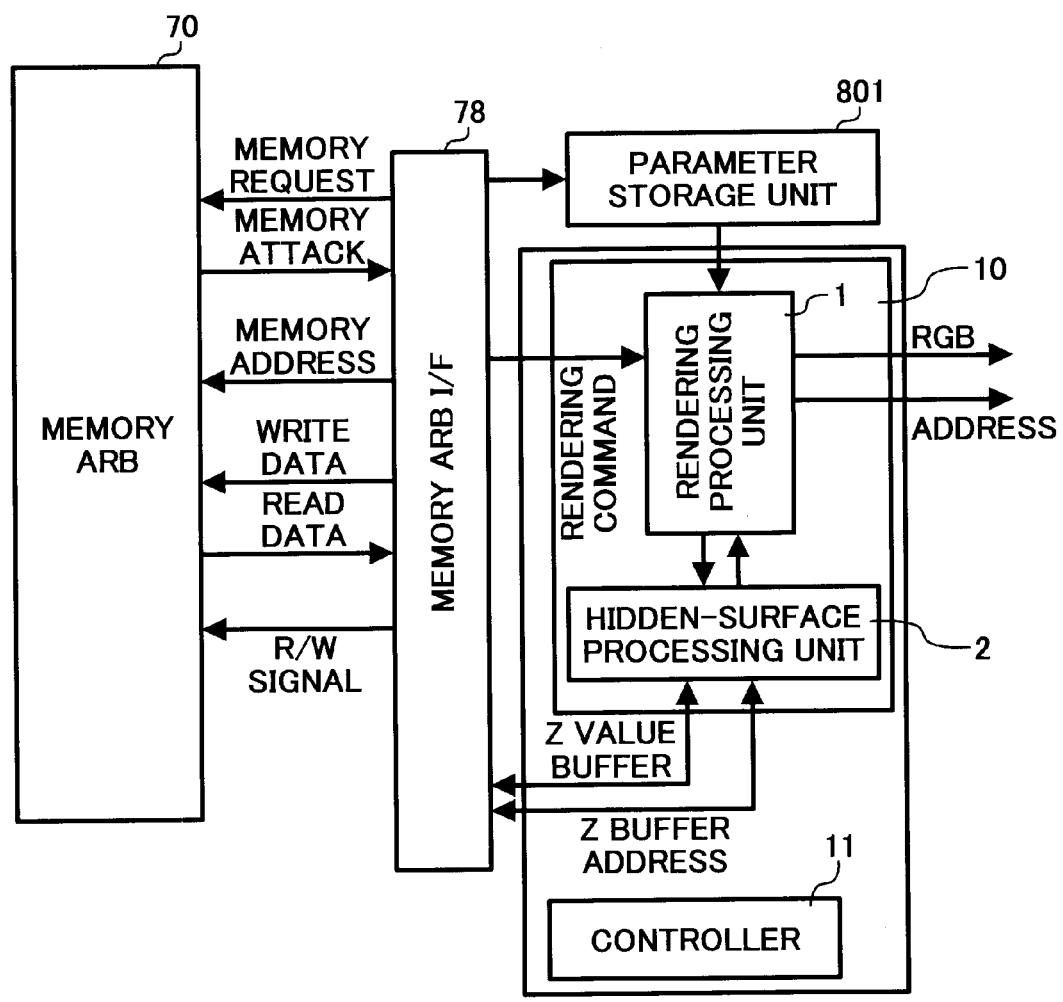
FIG. 6 is a functional block diagram of a rendering unit of the image forming apparatus according to the embodiment.

FIG. 6 is a functional block diagram of the rendering unit of the image forming apparatus according to the embodiment. The memory ARB I/F 78 interfaces with the memory ARB 70 for receiving a rendering command from the CPU 81 and transferring the rendering command to the rendering processing unit 1.

The rendering processing unit 1 receives the 3D rendering command from the CPU 81, and analyzes the rendering command. Also, the rendering processing unit 1 finds, from the color information of each end points of a triangular figure, horizontal differentials dRX, dGX, and dBX and vertical differentials dRY, dGY, and dBY through a plane equation. Furthermore, the rendering processing unit 1 finds band memory addresses and color information (RGB). Still further, the rendering processing unit 1 finds, from Z-value information of each end point of the triangular figure, a horizontal differential dZX and a vertical differential dZY through the plane equation. Still further, the rendering processing unit 1 finds Z values sequentially from the vertical direction to the horizontal direction. Here, dRX is an abbreviation of dR/dX. The same goes for the following description.

The rendering processing unit 1 sends the Z values and the Z-buffer memory addresses to the hidden-surface processing unit 2. The hidden-surface processing unit 2 performs a hidden-surface process on the image data and, based on the process results, transfers a memory address for each pixel to the image processing unit 3 by using a bandwidth of the band data and a logic address (X0, Y0, X1, Y1, X2, Y2) of each endpoint of the graphic image.

A parameter storage unit 801 temporarily stores parameters of the rendering processing unit 1.

The hidden-surface processing unit 2 receives the Z values and the Z-buffer addresses from the rendering processing unit 1, receives the corresponding Z values from the Z-buffer band memory of the main memory 7, and then performs a hidden-surface process. The hidden-surface processing unit 2 then writes, when updating, the Z values from the rendering processing unit 1 to the Z-buffer band memory of the main memory 7, and then reports the results of the hidden-surface process to the rendering processing unit 1. A controller 11 controls the entire rendering processing unit 1.

FIG. 7 is a flowchart of a rendering process to be performed by the image forming apparatus according to the embodiment. The controller 11 of the rendering processing unit 1 sets, to the parameter storage unit, each color's bandwidth of the band memory area in the main memory (step S101). The controller 11 then sets a color conversion table of a color converting nit 31 of the image processing unit 3 (step S102). The controller 11 then sets a dither address of a gray-scale processing unit 32 (step S103). The controller 11 then sets DDX and DDY values of an RGB correcting unit 15 of the rendering unit (step S104).

Next, the rendering processing unit 1 reads the rendering command (step S105). The rendering unit 10 then performs a rendering process and a hidden-surface process (step S106). The image processing unit 3 then performs color conversion (step S107). The image processing unit 3 then performs a gray-scale process (step S108). Then, whether all rendering commands have been processed is determined (step S109). It all rendering commands have been processed (Yes at step S109), the procedure ends.

Figure 8A:
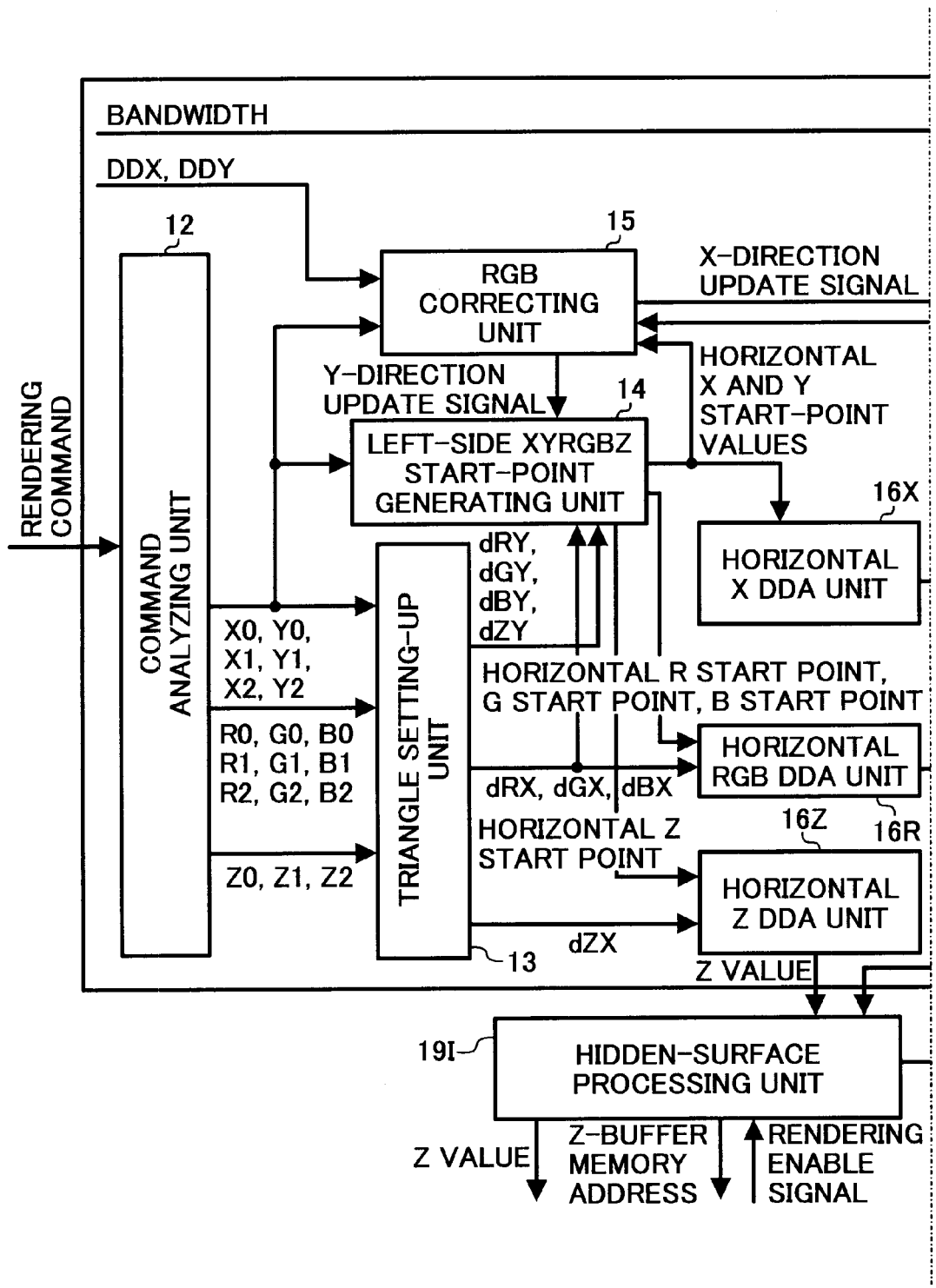
FIG. 8 is a functional block diagram of a rendering processing unit of the image forming apparatus according to the embodiment.
Figure 8B:
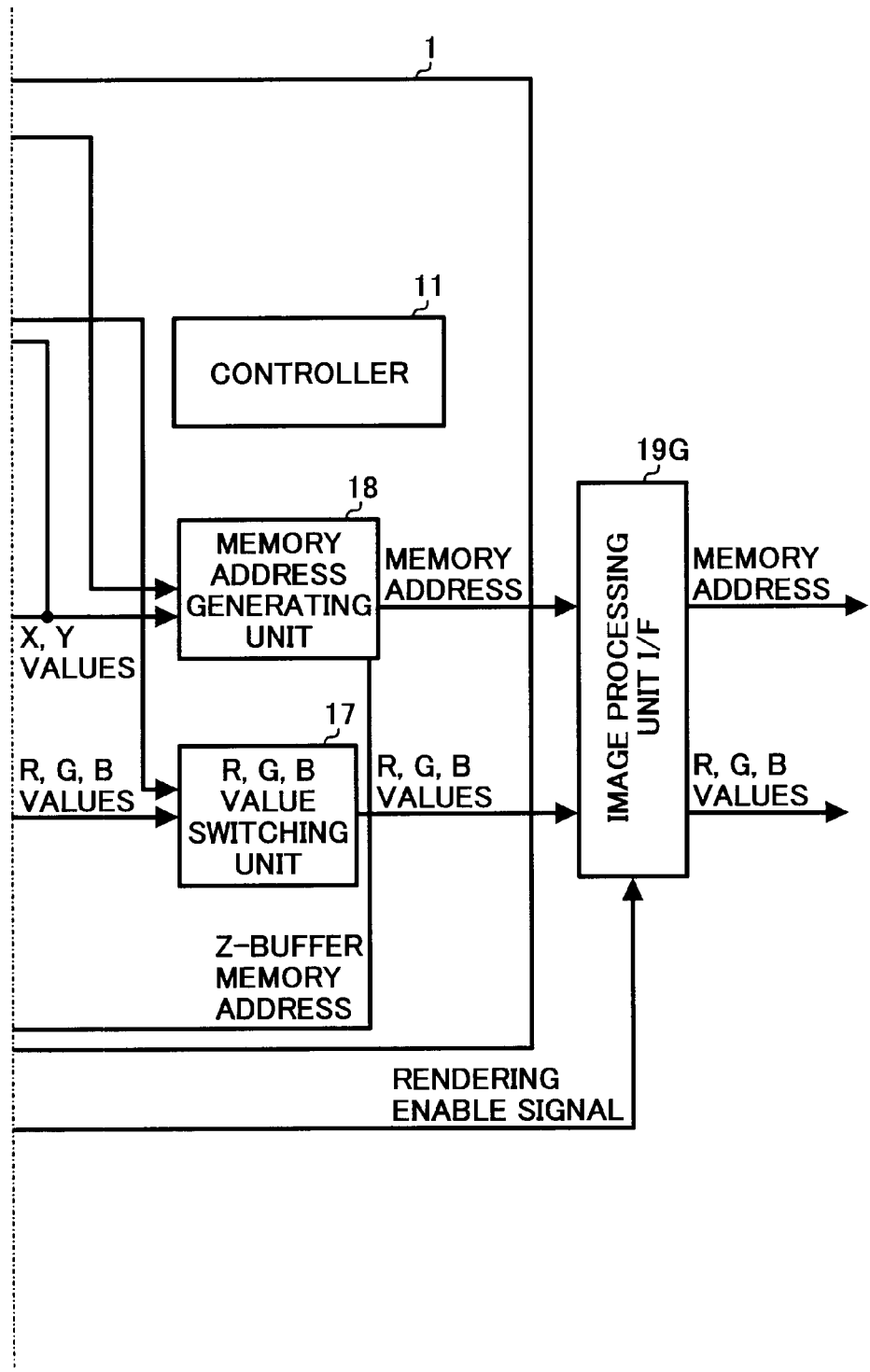

FIG. 8 is a functional block diagram of the rendering processing unit of the image forming apparatus according to the embodiment. The command analyzing unit 12 analyzes the rendering command from the CPU 81, calculates coordinates X0, Y0, X1, Y1, X2, and Y2 of each end point of the triangle, color information R0, G0, B0, R1, G1, B1, R2, G2, and B2, and Z-value information Z0, Z1, and Z2, and then transfers these calculated values to a triangle setting-up unit 13, a left-side XYRGBZ start-point generating unit 14, and the RGB correcting unit 15.

The triangle setting-up unit 13 finds, from the coordinates and the color information of each end point from the command analyzing unit 12, horizontal differentials dRX, dGX, dBX, and dZX and vertical differentials dRY, dGY, dBY, and dZY through the triangle's plane equation, and then transfers these values to the left-side XYRGBZ start-point generating unit 14, a horizontal RGB DDA unit 16R, and a horizontal Z DDA unit 16Z.

The triangle setting-up unit 13 forms a pre-rendering processing unit according to the present invention. The RGB correcting unit 15 and the left-side XYRGBZ start-point generating unit 14 form a rendering-start-point calculating unit. The RGB correcting unit 15, a horizontal X DDA unit 16X, the horizontal RGB DDA unit 16R, and the horizontal Z DDA unit 16Z form a horizontal interpolating unit according to the present invention. Also, the left-side XYRGBZ start-point generating unit 14 and the horizontal X DDA unit 16X form a position interpolating unit according to the present invention. The RGB correcting unit 15 and the horizontal RGB DDA unit 16R form a color interpolating unit according to the present invention. The horizontal Z DDA unit 16Z forms a Z-value interpolating unit according to the present invention. Also, the RGB correcting unit 15 forms a color-information correcting unit.

Equations (1-1) to (1-8) are equations for calculating horizontal and vertical differentials based on the triangle's plane equation. Here, in a scheme generally used for the hidden-surface process, it is assumed that a depth direction of a figure is a z-axis direction, an axis parallel to a horizontal plane and vertical to the z axis is an x axis (normally referred to as a horizontal axis), and an axis parallel to the z axis and the x axis is a y axis (normally referred to as a vertical axis). Therefore, Z values indicate values of z-axis components indicative of a depth, and a point with a deep depth is hidden behind a point with a shallow depth and is not seen. As such, a process of making a point unseen as a graphic process is a hidden-surface process.

$$\frac{dR}{dX} = \frac{(R2-R0)(X1-X0)+(R1-R0)(X2-X0)}{(Y2-Y0)(X1-X0)+(Y1-Y0)(X2-X0)} \quad (1\text{-}1)$$

$$\frac{dR}{dY} = \frac{(R2-R0)(Y1-Y0)+(R1-R0)(Y2-Y0)}{(Y2-Y0)(X1-X0)+(Y1-Y0)(X2-X0)} \quad (1\text{-}2)$$

$$\frac{dG}{dX} = \frac{(G2-G0)(X1-X0)+(G1-G0)(X2-X0)}{(Y2-Y0)(X1-X0)+(Y1-Y0)(X2-X0)} \quad (1\text{-}3)$$

$$\frac{dG}{dY} = \frac{(G2-G0)(Y1-Y0)+(G1-G0)(Y2-Y0)}{(Y2-Y0)(X1-X0)+(Y1-Y0)(X2-X0)} \quad (1\text{-}4)$$

$$\frac{dB}{dX} = \frac{(B2-B0)(X1-X0)+(B1-B0)(X2-X0)}{(Y2-Y0)(X1-X0)+(Y1-Y0)(X2-X0)} \quad (1\text{-}5)$$

$$\frac{dB}{dY} = \frac{(B2-B0)(Y1-Y0)+(B1-B0)(Y2-Y0)}{(Y2-Y0)(X1-X0)+(Y1-Y0)(X2-X0)} \quad (1\text{-}6)$$

$$\frac{dZ}{dX} = \frac{(Z2-Z0)(X1-X0)+(Z1-Z0)(X2-X0)}{(Y2-Y0)(X1-X0)+(Y1-Y0)(X2-X0)} \quad (1\text{-}7)$$

$$\frac{dZ}{dY} = \frac{(Z2-Z0)(Y1-Y0)+(Z1-Z0)(Y2-Y0)}{(Y2-Y0)(X1-X0)+(Y1-Y0)(X2-X0)} \quad (1\text{-}8)$$

The left-side XYRGBZ start-point generating unit 14 uses coordinates X0, Y0, X1, Y1, X2, and Y2 of each end points of the triangle from the command analyzing unit 12 and dRX, dGX, dBX, dZX, dRY, dGY, dBY, and dZY from the triangle setting-up unit 13 to find a horizontal start-point X value, R, G, and B values, and Z value in the horizontal direction are found.

Figure 9:
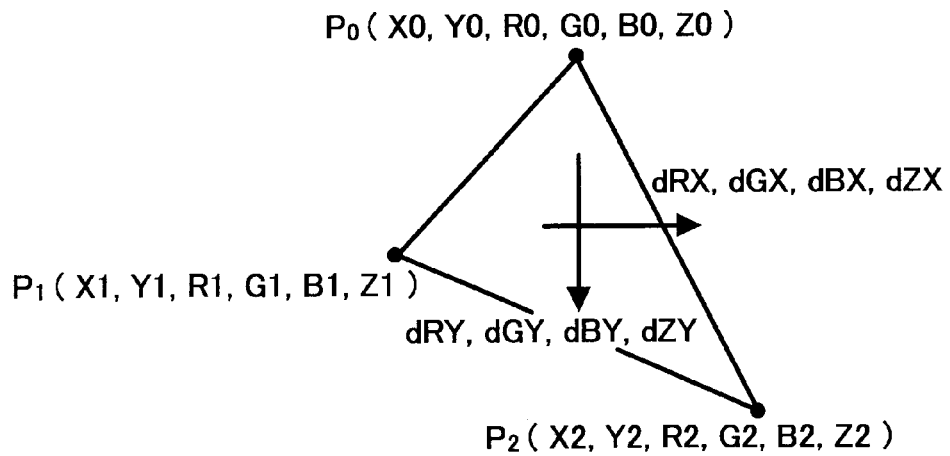
FIG. 9 is a diagram of x and y coordinates of three points of a triangle and R, G, B, and Z values in these coordinates generated in the rendering unit.

FIG. 9 is a diagram of x and y coordinates of three points of the triangle and R, G, B, and Z values in these coordinates generated in the rendering unit. The found start point X value, R, G, and B values, and Z value in the horizontal direction are transferred to the horizontal X DDA unit 16X, the horizontal RGB DDA unit 16R, and the horizontal Z DDA unit 16Z. Here, in the y direction, as shown in FIG. 9, a downward direction indicates a positive direction.

Here, the word "left side" used herein is described. In FIG. 9, a triangle includes three points P0, P1, and P2. Here, when this triangle is cut on a plane including the x axis, which is a horizontal-direction axis, two sides have two points of intersection. Of these points of intersection, a side having one of the points of intersection closer to the y axis is referred to as the left side. Therefore, the left-side XYRGBZ start-point generating unit 14 is a unit having a function of generating a point at which the left side is cut when the triangle is cut on the plane including the x axis.

Figure 10:
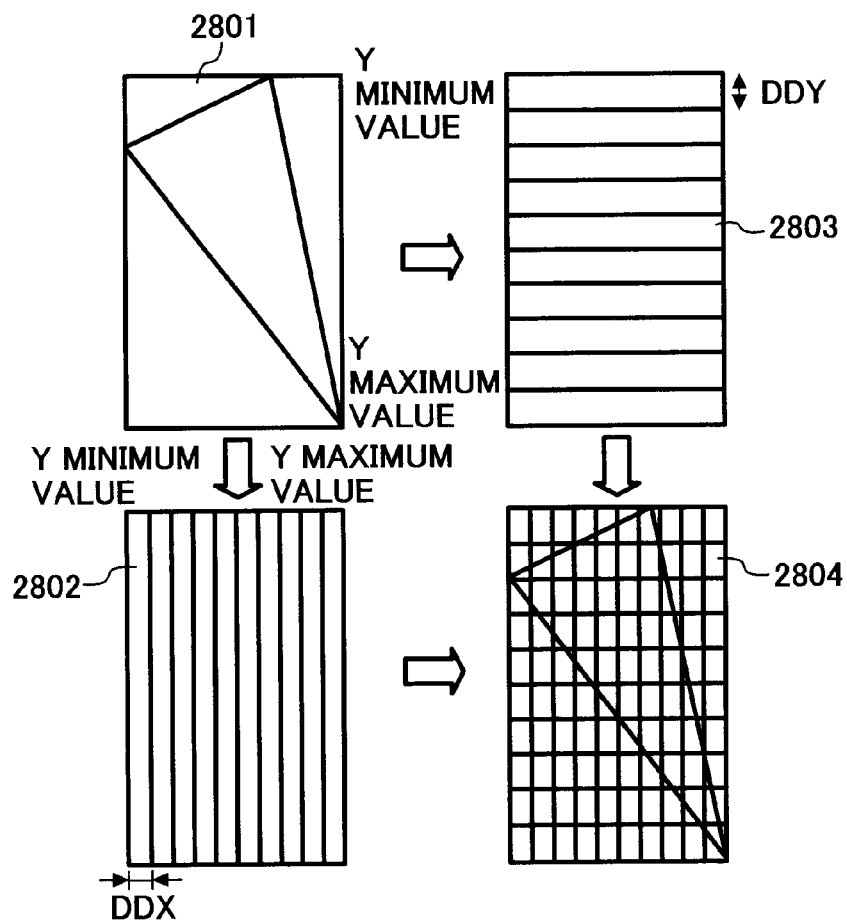
FIG. 10 is a diagram for explaining a correcting operation to be performed by an RGB correcting unit for correcting RGB by using a tetragon surrounding a triangle to be generated.

FIG. 10 is a diagram for explaining a correcting operation to be performed by the RGB correcting unit of correcting RGB by using a tetragon surrounding a triangle to be generated. The operation of the RGB correcting unit 15 (FIG. 8) is described below.

By using the coordinates X0, Y0, X1, Y1, X2, and Y2 of each end point of the triangle from the command analyzing unit 12, the RGB correcting unit 15 divides the tetragon surrounding the triangle by a length DDY of a minimum color in the vertical direction (2803), and by a length DDX of the minimum color in the horizontal direction (2802). Then, based on a mesh (2804), when the start-point X value and Y value in the horizontal direction output from the left-side XYRGBZ start-point generating unit 14 are overlaid on the mesh in the vertical direction, the RGB correcting unit 15 sends a Y-direction updating signal to update the horizontal R, G, and B values transferred from the left-side XYRGBZ start-point generating unit 14 to the horizontal X DDA unit 16X and the horizontal RGB DDA unit 16R.

Also, the RGB correcting unit 15 monitors an X value for each horizontal pixel of the horizontal X DDA unit 16X and, when the X value is overlaid on the mesh in the horizontal direction, sends an X-direction updating signal to cause an RGB-value switching unit 17 to update the R, G, and B values output from the horizontal RGB DDA unit 16R. With this operation, calculation is performed at a normal resolution on a portion of the sides of the figure, but in a filled-in image of the figure, its resolution can be changed.

Referring back to FIG. 8, the horizontal X DDA unit 16X receives the horizontal X start-point value from the left-side XYRGBZ start-point generating unit 14, finds X values of the triangle sequentially for each pixel in the horizontal direction by DDA, and then transfers the X values to the RGB correcting unit 15 and the memory address generating unit 18.

The horizontal RGB DDA unit 16R receives the horizontal differential dRX, dGX, and dBX from the triangle setting-up unit 13 and horizontal RGB start points from the left-side XYRGBZ start-point generating unit 14, interpolates the RGB in the horizontal direction for each pixel, and then transfers the results to the RGB switching unit 17.

The RGB switching unit 17 updates the RGB values received from the horizontal RGB DDA unit 16R based on the X-direction updating signal from the RGB correcting unit 15.

The memory address generating unit 18 converts the logic coordinates X and Y values of the band memory supplied from the horizontal X DDA unit 16X from the bandwidth of the band memory to physical coordinates of the band memory, and then transfers the results to an image processing unit I/F 19G and a hidden-surface processing I/F 19I.

When rendering is performed based on the results of the hidden-surface process supplied from the hidden-surface processing unit 2, the image processing unit I/F 19G transfers the addresses from the memory address generating unit 18 and the RGB information from the RGB switching unit 17 to the image processing unit 3.

The hidden-surface processing I/F 19I transfers the Z values from the horizontal Z DDA unit 16Z and the Z-buffer memory addresses from the memory address generating unit 18 to the hidden-surface processing unit 2, receives the results of the hidden-surface process, and then transfers the results of the hidden-surface process to the image processing unit I/F 19G.

The horizontal Z DDA unit 16Z receives the horizontal differential dZX received from the triangle setting-up unit 13 and the horizontal Z start point received from the left-side XYRGBZ start-point generating unit 14, interpolates the Z values in the horizontal direction for each pixel, and then transfers the results to the hidden-surface processing unit I/F 19I.

The controller 11 controls the rendering processing unit 1.

Figure 11B:
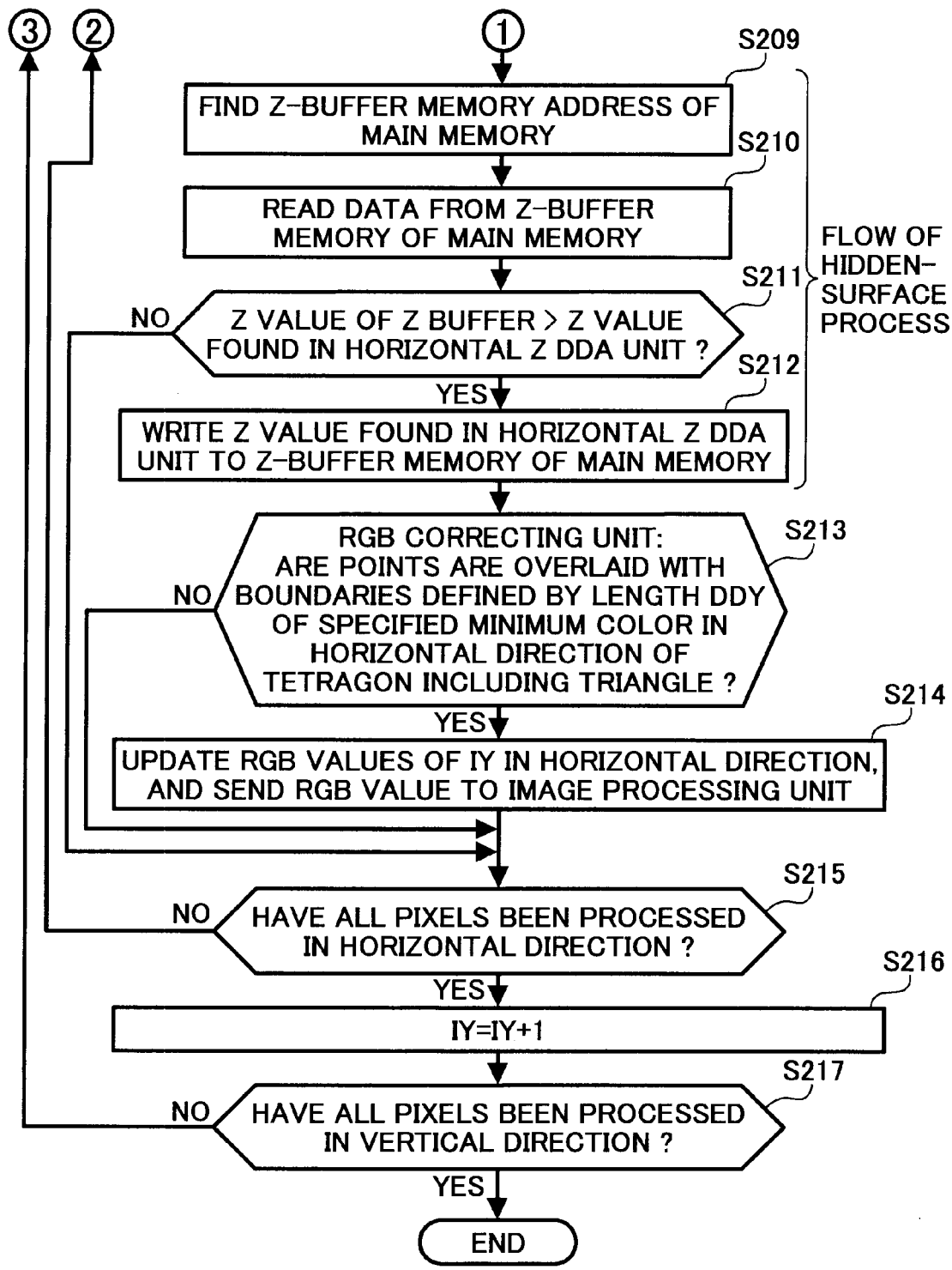
FIG. 11 is a flowchart of a rendering process to be performed by the rendering processing unit of the image forming apparatus according to the embodiment.

FIG. 11 is a flowchart of a rendering process to be performed by the rendering processing unit of the image forming apparatus according to the embodiment. The command analyzing unit 12 analyzes the rendering command to find the end points X0, Y0, X1, X2, Y1, and Y2 of the triangle and the color information R0, G0, B0, R1, G1, B1, R2, G2, and B2 and the Z information Z0, Z1, and Z2 (step S201). The triangle setting-up unit then finds the horizontal differentials dRX, dGX, dBX, and dZX and the vertical differentials dRY, dGY, dBY, and dXY (step S202).

Here, IY=0 is set (step S203). The left-side XYRGBZ start-point generating unit 14 finds the left side from a vector of the side of the triangle, and then finds horizontal start-point X, R, G, B, and Z values in the vertical direction IY of that side (step S204).

The RGB correcting unit 15 determines whether the found points are overlaid on boundaries defined by the length DDY of the specified minimum color in the vertical direction of the tetragon surrounding the triangle (step S205). When determining that the points are overlaid (Yes at step S205), the RGB correcting unit 15 updates the start point RGB values of IY in the horizontal direction (step S206). The horizontal X DDA unit 16X then finds an X value in the horizontal direction (step S207). When the RGB correcting unit 15 determines that the points are not overlaid (No at step S205), the procedure returns to step S207.

Next, the horizontal RGB DDA unit 16R finds RGB in the horizontal direction, and the horizontal Z DDA unit 16Z finds a Z value in the horizontal direction (step S208). The hidden-surface processing unit 2 then finds an address in the Z-buffer memory storage area 71 of the main memory 7 (step S209), and then reads the address in the Z-buffer memory storage area 71 of the main memory 7 (step S210). It is then determined whether the Z value of the Z buffer is larger than the Z value found by the horizontal Z DDA unit 16 (step S211). If it is determined as No, the procedure jumps to step S215 (which will be described further below). If it is determined that the Z value is larger than the found Z value, the Z value found by the horizontal Z DDA unit 16 is written in the Z buffer memory storage area 71 of the main memory (step S212). Here, steps S208 through S212 are the operation of the hidden-surface process.

Furthermore, the RGB correcting unit 15 determines whether the found points are overlaid on boundaries defined by the length DDY of the specified minimum color in the horizontal direction of the tetragon surrounding the triangle (step S213). If it is determined as No (No at step S213), the procedure jumps to step S215 (which will be described further below). If it is determined as Yes (Yes at step S213), the RGB values of IY in the horizontal direction are updated, and are then sent to the image processing unit (step S214).

Still further, it is determined whether all pixels have been processed in the horizontal direction (step S215). If it is determined as No, the procedure returns to step S207. On the other hand, if it is determined that all pixels have been processed (Yes at step S215), IY=IY+1 is set (step S216). It is then determined whether all pixels have been processed in the vertical direction (step S217). If it is determined that all pixels have been processed (Yes at step S217), the process ends.

Figure 12:
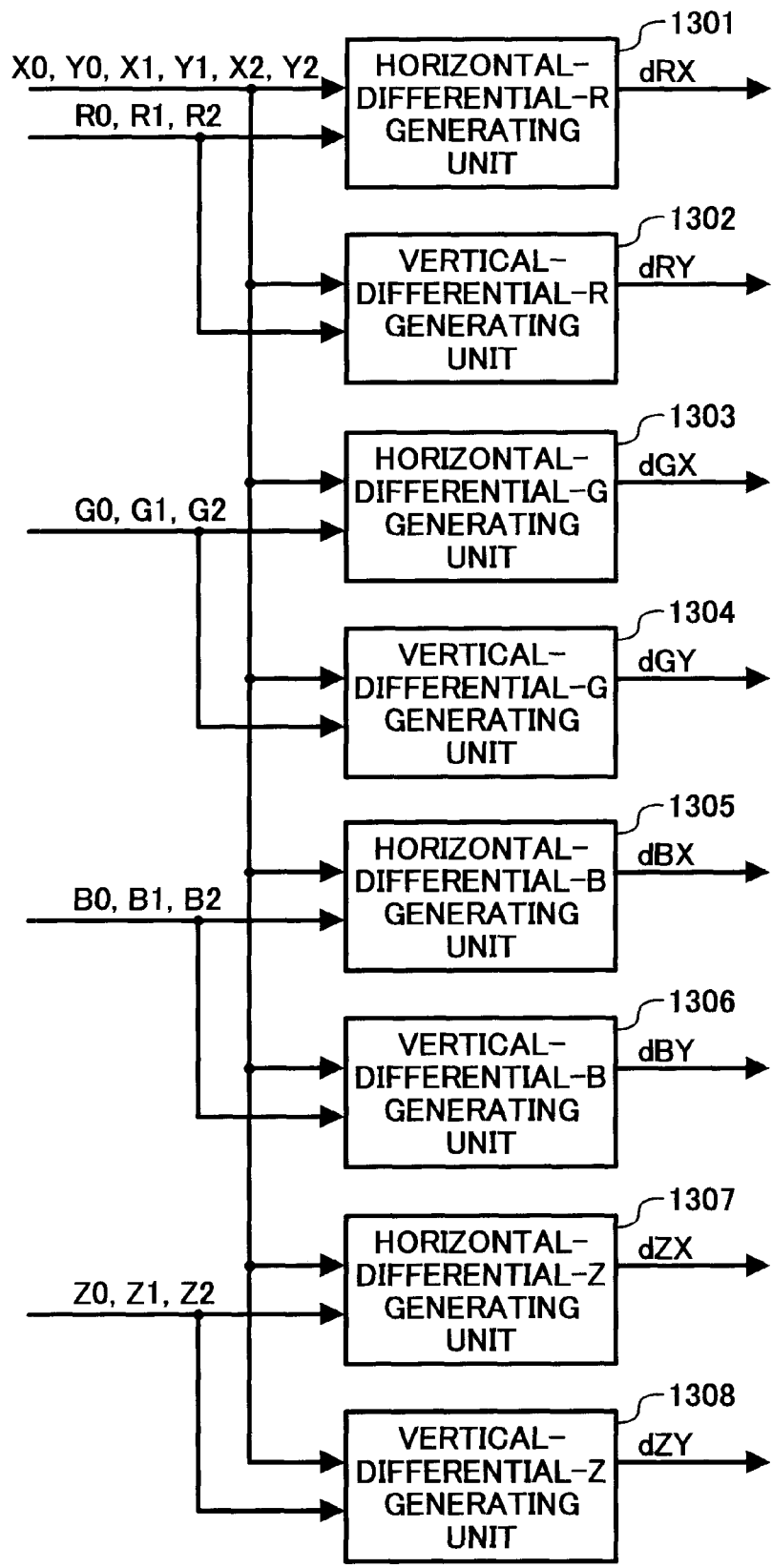
FIG. 12 is a block diagram of a triangle setting-up unit in the rendering processing unit.

FIG. 12 is a block diagram of the triangle setting-up unit in the rendering processing unit of the image forming apparatus according to the embodiment. A horizontal-differential-R generating unit 1301 finds a differential dRX of the R value in the horizontal direction based on the triangle's plane equation. As described above, dRX is an abbreviation of dR/dX. The same goes for the following description.

Also, a vertical-differential-R generating unit 1302 finds a differential dRY of the R value in the vertical direction based on the triangle's plane equation. A horizontal-differential-G generating unit 1303 finds a differential dGX of the G value in the horizontal direction based on the triangle's plane equation. A vertical-differential-G generating unit 1304 finds a differential dGY of the G value in the vertical direction based on the triangle's plane equation.

A horizontal-differential-B generating unit 1305 finds a differential dBX of the B value in the horizontal direction based on the triangle's plane equation. A vertical-differential-B generating unit 1306 finds a differential dBY of the B value in the vertical direction based on the triangle's plane equation. A horizontal-differential-Z generating unit 1307 finds a differential dZX of the Z value in the horizontal direction based on the triangle's plane equation. A vertical-differential-Z generating unit 1308 finds a differential dZY of the Z value in the vertical direction based on the triangle's plane equation.

Figure 13:
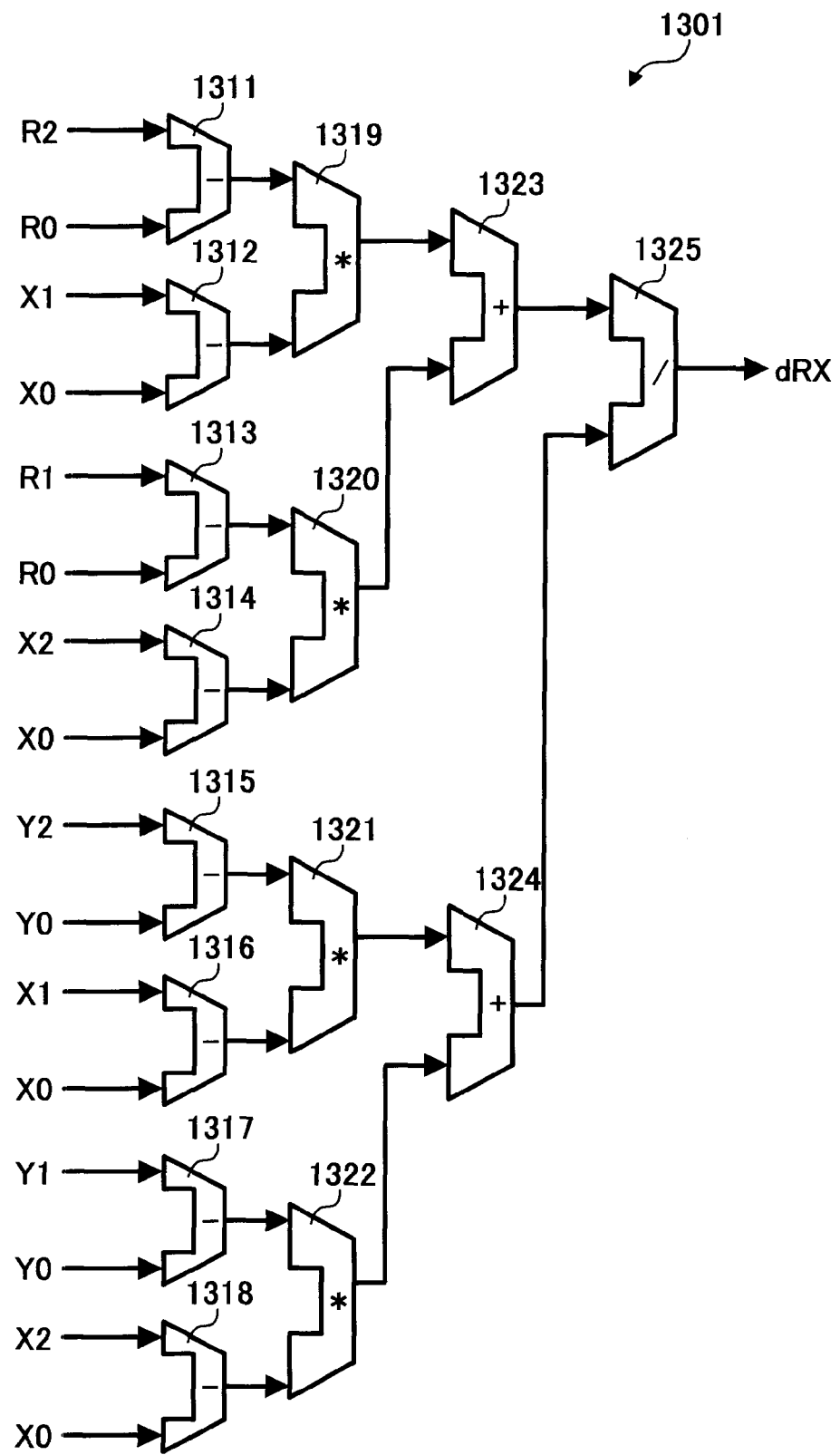
FIG. 13 is a block diagram of a horizontal-differential-R generating unit shown in FIG. 12.

FIG. 13 is a block diagram of the horizontal-differential-R generating unit shown in FIG. 12. FIG. 13 is a hardware representation of dR/dX of Equation (1-1).

Figure 14:
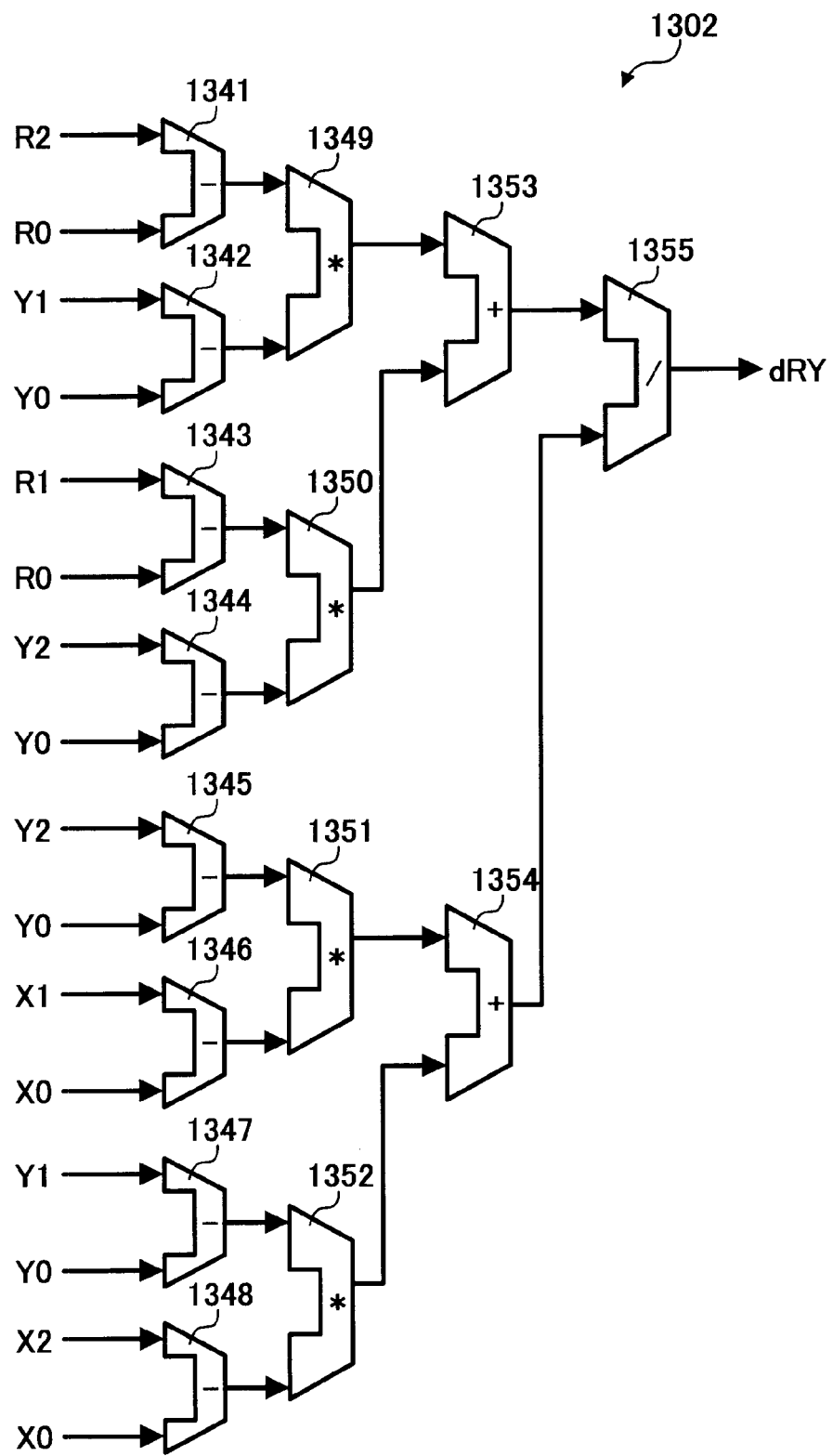
FIG. 14 is a block diagram of a vertical-differential-R generating unit shown in FIG. 12.

FIG. 14 is a block diagram of the vertical-differential-R generating unit shown in FIG. 12. FIG. 14 is a hardware representation of dR/dY of Equation (1-2).

Figure 15:
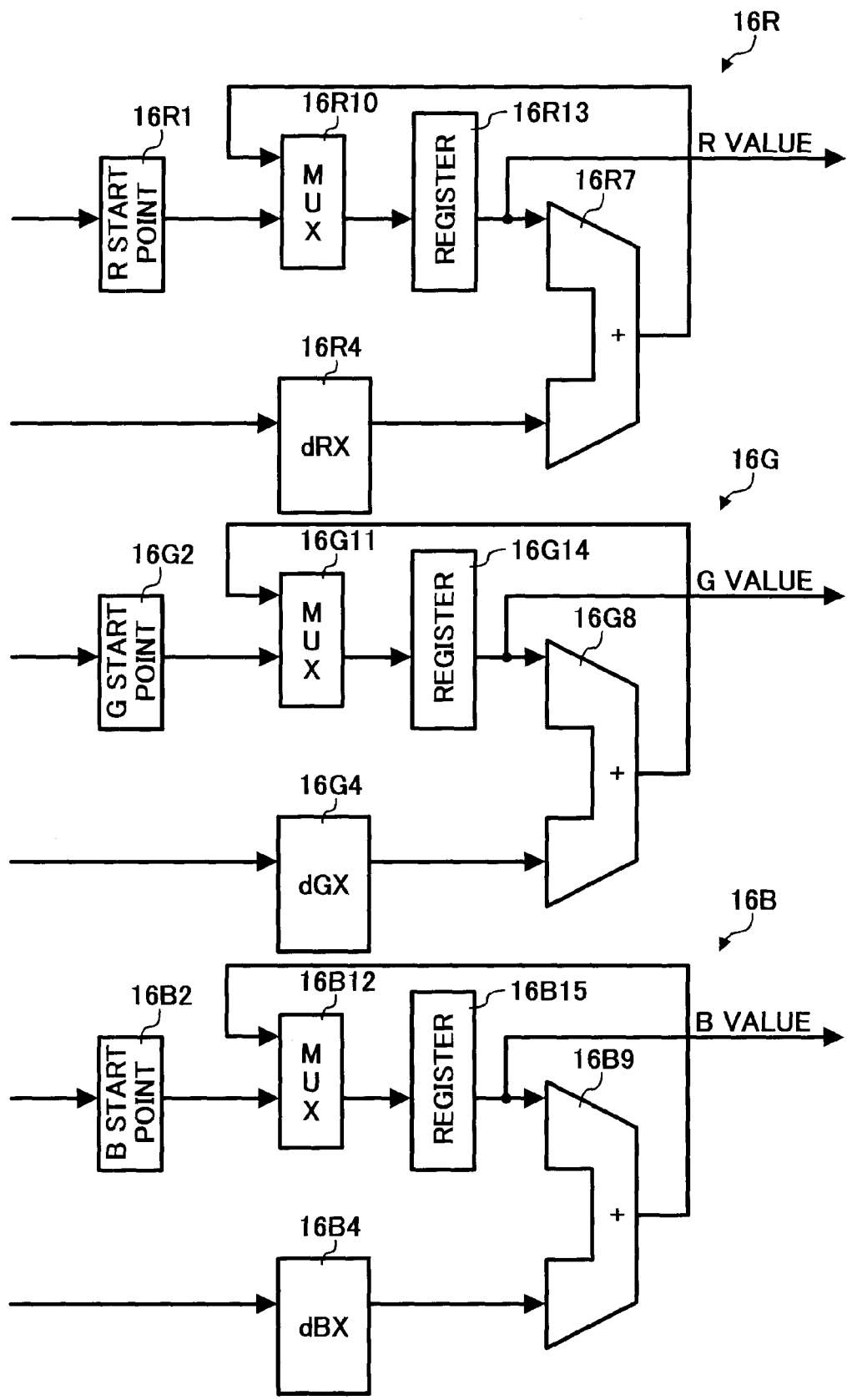
FIG. 15 is a block diagram of a horizontal RGB DDA unit 16R shown in FIG. 8.

FIG. 15 is a block diagram of a horizontal RGB DDA unit 16R shown in FIG. 8. Registers 16R1, 16G2, and 16B3 store R G, and B start-point values, respectively, in the horizontal direction from the left-side XYRGBZ start-point generating unit 14. Registers 16R4, 16G5, and 16B6 store R G, and B differentials, respectively, in the horizontal direction from the triangle setting-up unit 13. Adders 16R7, 16G8, and 16B9 each perform an adding operation for a DDA process of R, G, and B, respectively.

The multiplexers (MUX) 16R10, 16G11, and 16G12 transfer the start point values of R, G, and B of the registers 16R1, 16G2, and 163 to registers 16R13, 16G14, and 16B15 as initial values in the DDA process of R, G, and B, respectively. Then, during the DDA process, these multiplexers transfer outputs of adders 16R7, 16G8, and 16B9 to the registers 16R13, 16G14, and 16B15, respectively. The registers 16R13, 16G14, and 16B15 stores the results of the DDA process of R, G, and B, respectively.

Figure 16:
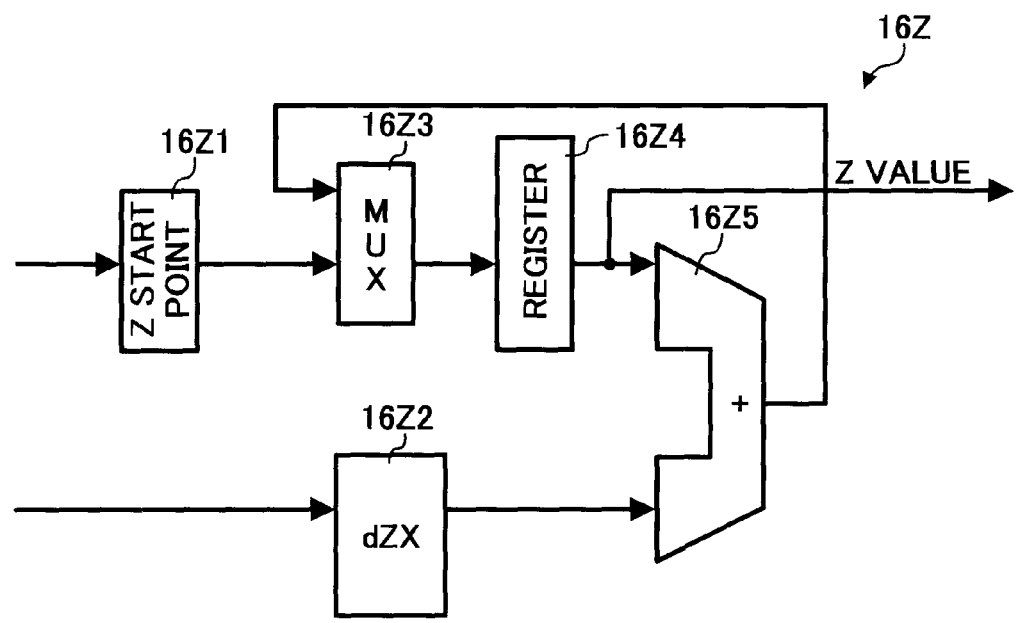
FIG. 16 is a block diagram of a horizontal Z DDA unit in the rendering processing unit.

FIG. 16 is a block diagram of the horizontal Z DDA unit in the rendering processing unit. A register 16Z1 stores a start point value in the horizontal direction from the left-side XYRGBZ start-point generating unit 14. A register 16Z2 stores a differential of Z in the horizontal direction from the triangle setting-up unit 13. An adder 16Z5 performs an adding operation for a DDA process on Z. A MUX 16Z3 transfers a start point value of the register 16Z1 to a register 16Z4 as an initial value for the DDA process on Z and, thereafter during the DDA process, transfers an output from the adder 16Z5 to the register 16Z4. The register 16Z4 stores the results of the DDA process on Z.

Figure 17A:
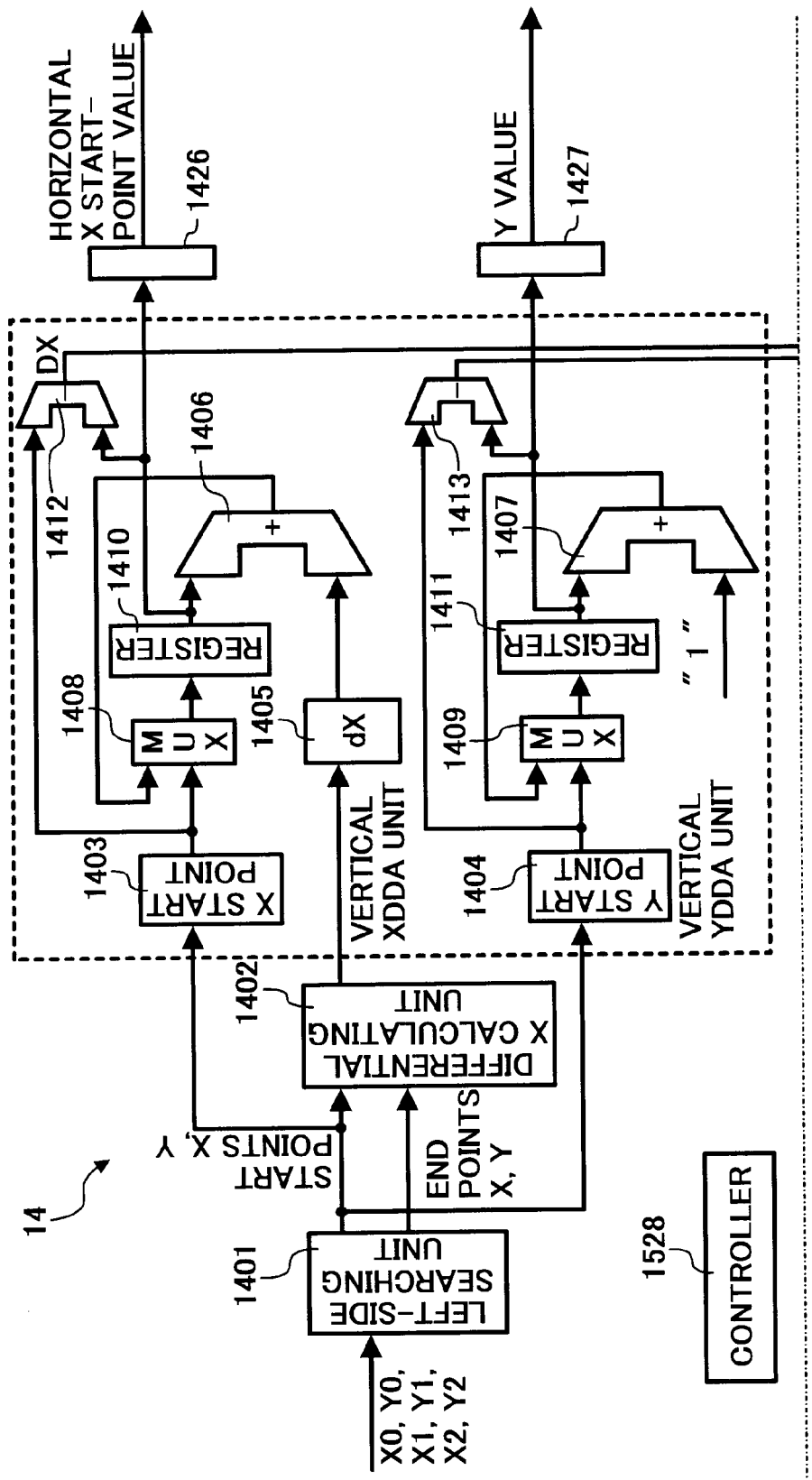
FIG. 17 is a block diagram of a left-side XYRGBZ start-point generating unit in the rendering processing unit.
Figure 17B:
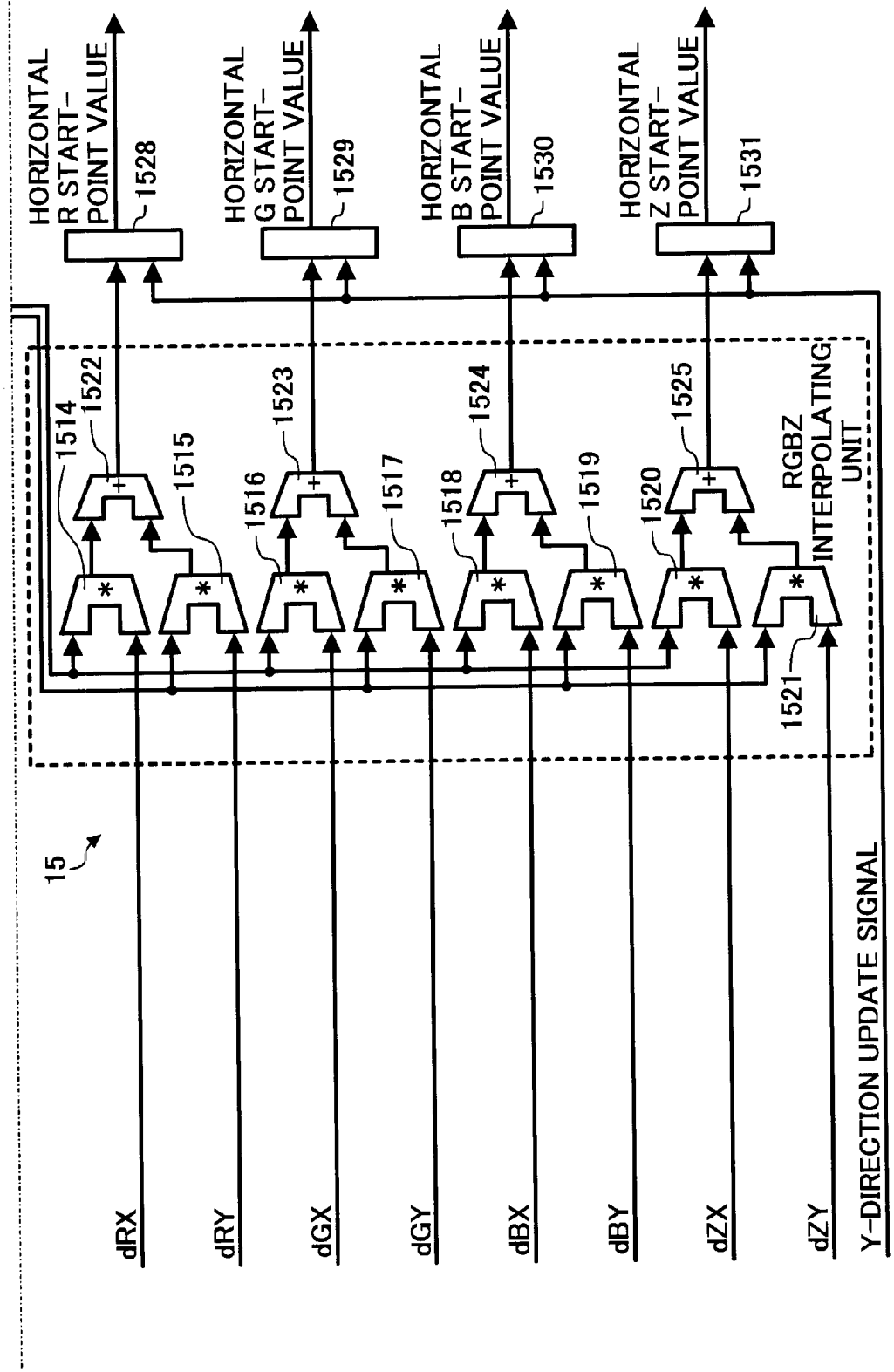
Figure 18:
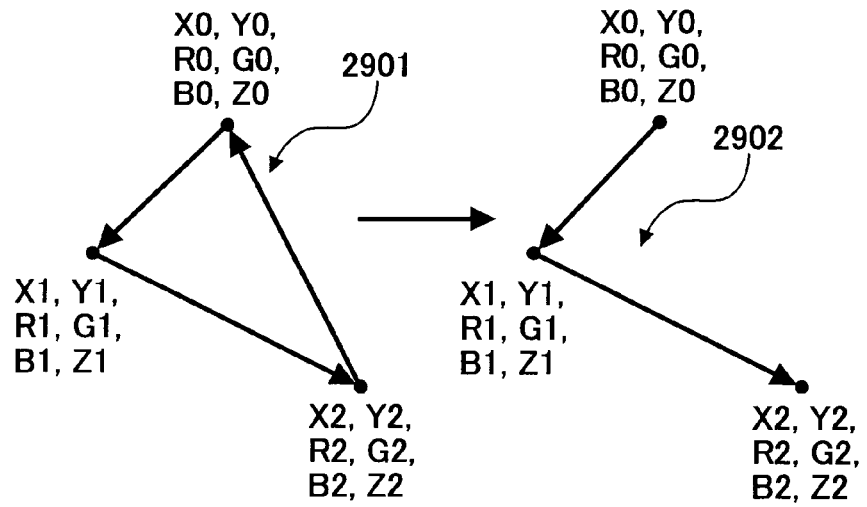
FIG. 18 is a diagram for explaining calculation of a change ratio of each RGBZ with respect to an x axis direction and a y axis direction.
Figure 19:
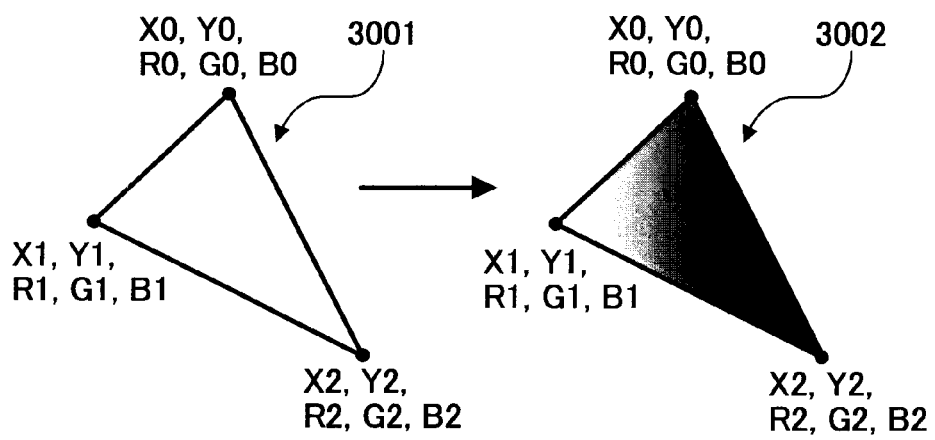
FIG. 19 is a diagram for explaining generation of a gradient fill of a triangle from the calculated change ratio of each RGBZ with respect to the x axis direction and the y axis direction.

FIG. 17 is a block diagram of the left-side XYRGBZ start-point generating unit in the rendering processing unit. FIG. 18 is a diagram for explaining calculation of a change ratio of each RGBZ with respect to the x axis direction and the y axis direction. FIG. 19 is a diagram for explaining generation of a gradient fill of a triangle from the calculated change ratio of each RGBZ with respect to the x axis direction and the y axis direction.

A left-side searching unit 1401 searches for a left side in Equation 1 based on the directions of the sides extending from the respective end points of the triangle shown in FIG. 18, and then transfers X and Y values representing the start point and X and Y values representing the end point to a differential X calculating unit 1402 and the X and Y values representing the start point to each of the registers 1403 and 1404.

The differential X calculating unit 1402 receives the X and Y values representing the start point and the X and Y values representing the end point from the left-side searching unit 1401, finds its differential in the vertical direction, that is, (end point X-start point X)/(end point Y-start point Y), and then transfers the result to a register 1405. The register 1403 stores the start point X value from the left-side searching unit 1401. The register 1404 stores the start point Y value from the left-side searching unit 1401. The register 1405 stores the differential X value from the differential X calculating unit. 1402

An adder 1406 performs an adding operation for DDA on X in the vertical direction. An adder 1407 performs an adding operation for DDA on Y in the vertical direction. The MUX 1408 transfers the start point X value of the register 1403 to a register 1410 as an initial value for a DDA process on X in the vertical direction and, thereafter during the DDA process, transfers an output from the adder 1406 to the register 1410.

The MUX 1409 transfers the start point Y value of the register 1404 to a register 1411 as an initial value for a DDA process on Y in the vertical direction and, thereafter during the DDA process, transfers an output from an adder 1407 to a register 1411. The register 1410 stores the results of the DDA process on X in the vertical direction. The register 1411 stores the results of the DDA process on Y in the vertical direction.

A subtracter 1412 subtracts the start point X value from the X value of the results of the DDA process on X in the vertical direction stored in the register 1410, finds an X differential from the start point X value of the left side being processed, and then transfers the X differential to multipliers 1514, 1516, and 1518 of the RGB correcting unit 15. A subtracter 1413 subtracts the start point Y value from the Y value of the results of the DDA process on Y in the vertical direction stored in the register 1411, finds a Y differential from the start point Y value of the left side being processed, and then transfers the Y differential to multipliers 1515, 1517, and 1519 of the RGB correcting unit 15.

From the differentials in the X and Y directions found in the subtracters 1412 and 1413 and the differentials found in the triangle setting-up unit 13, the RGB correcting unit 15, which is a unit that performs a process of interpolating the RGBZ values, performs two-dimensional interpolation to find RGBZ start points of the left side in the horizontal direction.

The multiplier 1514 multiplies the horizontal differential dRX from the triangle setting-up unit 13 by the vertical X differential from the subtracter 1412, and then transfers the multiplication result to the adder 1522. The multiplier 1515 multiplies the horizontal differential dRY from the triangle setting-up unit 13 by the vertical Y differential from the subtracter 1413, and then transfers the multiplication result to the adder 1522.

The multiplier 1516 multiplies the horizontal differential dGX from the triangle setting-up unit 13 by the vertical X differential from the subtracter 1412, and then transfers the multiplication result to the adder 1523. The multiplier 1517 multiplies the horizontal differential dGY from the triangle setting-up unit 13 by the vertical Y differential from the subtracter 1413, and then transfers the multiplication result to the adder 1523.

The multiplier 1518 multiplies the horizontal differential dBX from the triangle setting-up unit 13 by the vertical X differential from the subtracter 1412, and then transfers the multiplication result to the adder 1524. The multiplier 1519 multiplies the horizontal differential dBY from the triangle setting-up unit 13 by the vertical Y differential from the subtracter 1413, and then transfers the multiplication result to the adder 1524.

The multiplier 1520 multiplies the horizontal differential dZX from the triangle setting-up unit 13 by the vertical X differential from the subtracter 1412, and then transfers the multiplication result to the adder 1525. The multiplier 1521 multiplies the horizontal differential dZY from the triangle setting-up unit 13 by the vertical Y differential from the subtracter 1413, and then transfers the multiplication result to the adder 1525.

The adder 1522 adds the multiplication results of the multipliers 1514 and 1515. The adder 1523 adds the multiplication results of the multipliers 1516 and 1517. The adder 1524 adds the multiplication results of the multipliers 1518 and 1519. The adder 1525 adds the multiplication results of the multipliers 1520 and 1521.

A register 1426 stores an X value of the result of the X DDA process on the left side in the vertical direction. A register 1427 stores a Y value of the result of the Y DDA process on the left side in the vertical direction. A register 1528 updates an R value of the result of RGB interpolation on the left side in the vertical direction if a Y-direction update signal from the RGB correcting unit 15 is ON. A register 1529 updates a G value of the result of RGB interpolation on the left side in the vertical direction if a Y-direction update signal from the RGB correcting unit 15 is ON. A register 1530 updates a B value of the result of RGB interpolation on the left side in the vertical direction if a Y-direction update signal from the RGB correcting unit 15 is ON. A register 1531 updates a Z value of the result of RGB interpolation on the left side in the vertical direction if a Y-direction update signal from the RGB correcting unit 15 is ON.

Figure 20:
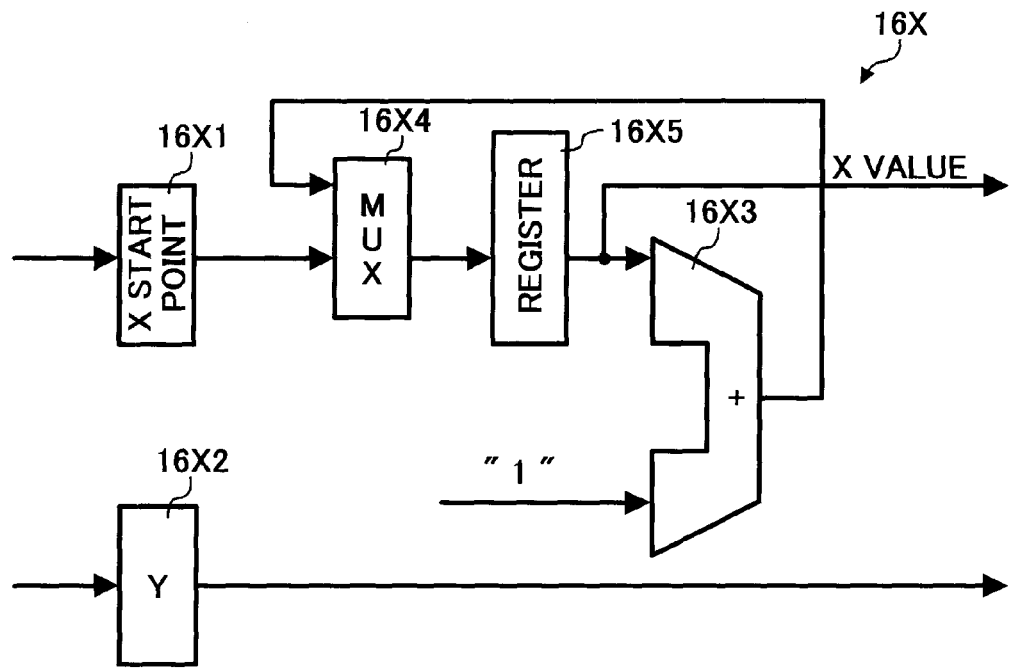
FIG. 20 is a block diagram of a horizontal X DDA unit of the rendering processing unit.

FIG. 20 is a block diagram of a horizontal X DDA unit of the rendering processing unit. A register 16X1 stores a start point value of an X value in the horizontal direction from the left-side XYRGBZ start-point generating unit 14. A register 16X2 stores a start point value of a Y value in the horizontal direction from the left-side XYRGBZ start-point generating unit 14. An adder 16X3 performs an adding operation for a DDA process on X. A MUX 16X4 transfers the start point X value of the register 16X1 to a register 16X5 as an initial value for a DDA process on X and, thereafter during the DDA process, transfers an output from the adder 16X3 to the register 16X5. The register 16X5 stores the result of the DDA process on X.

Figure 21:
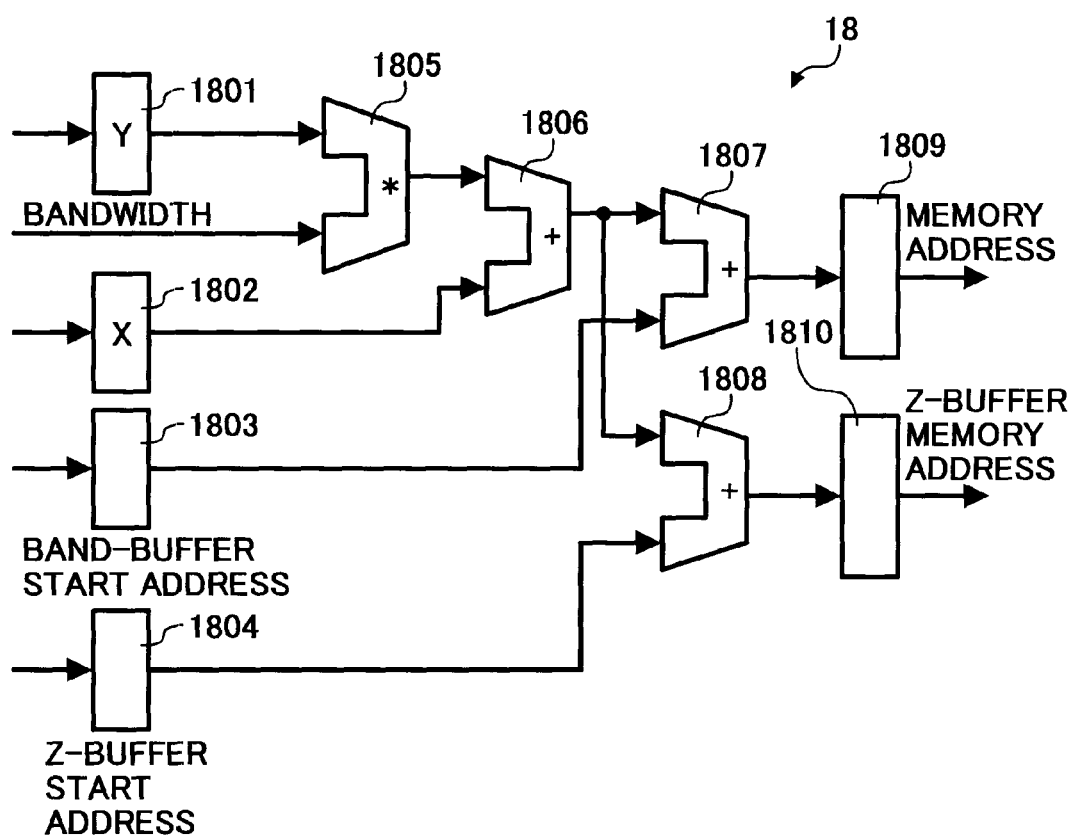
FIG. 21 is a block diagram of a memory address generating unit of the rendering processing unit.

FIG. 21 is a block diagram of the memory address generating unit of the rendering processing unit. A register 1801 stores a Y value of an output from the horizontal X DDA unit 16X. A register 1802 stores an X value of an output from the horizontal X DDA unit 16X. A multiplier 1805 multiplies the Y value stored in the register 1801 by the bandwidth. An adder 1806 adds the multiplication result from the multiplier 1805 and the X value stored in the register 1802 together to find a physical address.

Figure 22:
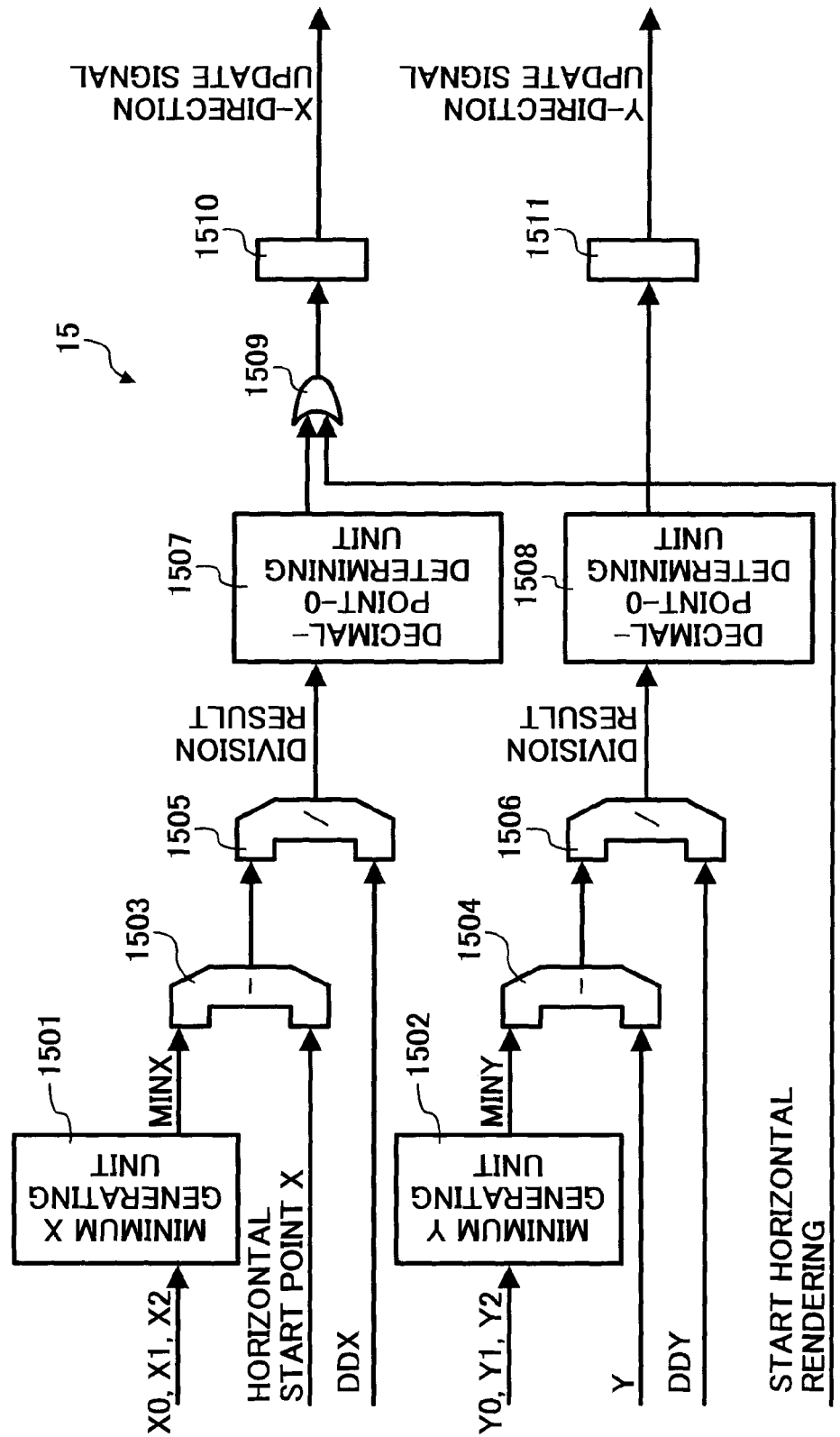
FIG. 22 is a block diagram of an RGB correcting unit in the rendering processing unit.

FIG. 22 is a block diagram of the RGB correcting unit in the rendering processing unit. A MIN X generating unit 1501 receives X coordinates X0, X1, and X2 of the end points of the triangle from the command analyzing unit 12, finds a minimum X value, and then transfers the found minimum X value to a subtracter 1503. A MIN Y generating unit 1502 receives Y coordinates Y0, Y1, and Y2 of the end points of the triangle from the command analyzing unit 12, finds a minimum Y value, and then transfers the found minimum Y value to a subtracter 1504.

The subtracter 1503 receives the horizontally-interpolated X value from the horizontal X DDA unit 16X and the MIN X value from the MIN X generating unit 1501, and finds, as shown in FIG. 10, a differential from the MIN X value in the horizontal direction of the tetragon surrounding the triangle.

The subtracter 1504 receives the Y value from the horizontal X DDA unit 16X and the MIN Y value from the MIN Y generating unit 1502, and finds, as shown in FIG. 10, a differential from the MIN Y value in the vertical direction of the tetragon surrounding the triangle.

A divider 1505 receives a length DDX of the minimum color in the horizontal direction as shown in FIG. 10 from the parameter storage unit 801 (FIG. 6), divides the differential from the subtracter 1503 by the length DDX, and then transfers the result to a decimal-point-0 determining unit 1507. A divider 1506 receives a length DDY of the minimum color in the vertical direction from the parameter storage unit 801, divides the differential from the subtracter 1504 by the length DDY, and then transfers the result to a decimal-point-0 determining unit 1508.

The decimal-point-0 determining unit 1507 receives the result of the divider 1505 to confirm that no decimal point is present (the differential is divisible), and then determines whether the points are overlaid on the mesh as shown in FIG. 10 in the horizontal direction. The decimal-point-0 determining unit 1508 receives the result of the divider 1506 to confirm that no decimal point is present (the differential is divisible), and then determines whether the points are overlaid on the mesh as shown in FIG. 10 in the vertical direction.

An OR circuit 1509 receives a horizontal rendering start signal from the controller 11 (FIG. 8). If horizontal rendering has been started, the OR circuit 1509 unconditionally generates an update signal in the X direction. A register 1510 stores the X-direction update signal from the OR circuit 1509. A register 1511 stores a Y-direction update signal from the decimal-point-0 determining unit 1508.

Figure 23:
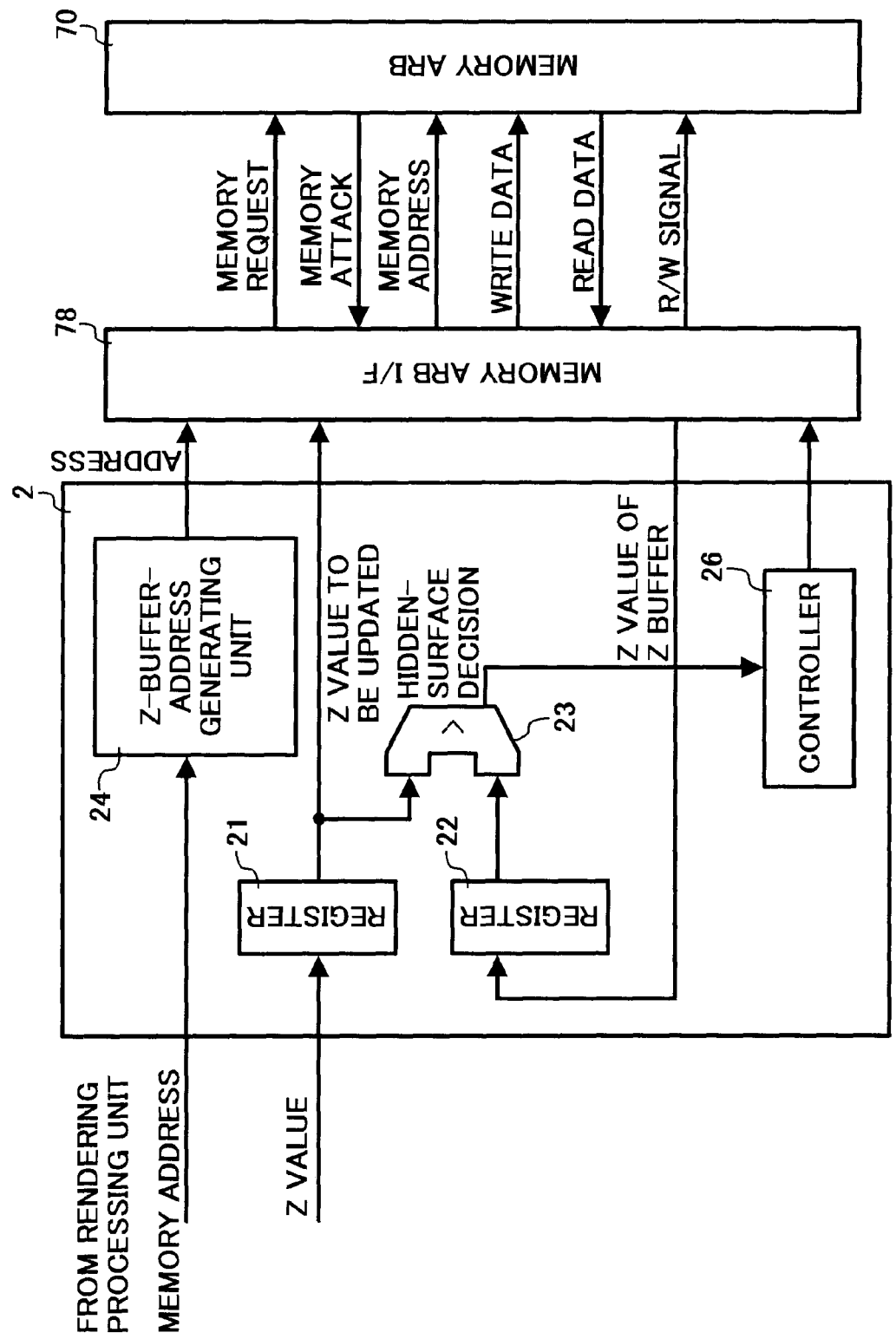
FIG. 23 is a block diagram of a hidden-surface processing unit in the image forming apparatus according to the embodiment.

FIG. 23 is a block diagram of the hidden-surface processing unit in the image forming apparatus according to the embodiment. A register 21 stores a Z value from the rendering processing unit 1. A register 22 stores a Z value read from the Z buffer memory 71 (FIG. 4) of the main memory 7.

A comparator 23 compares the values of the registers 21 and 22 to determine whether pixels being processed by the rendering processing unit 1 can be displayed. A Z-buffer-address generating unit 24 stores a Z-buffer memory address from the rendering processing unit 1. A controller 26 controls the entirety of the hidden-surface processing unit 2.

Figure 24:
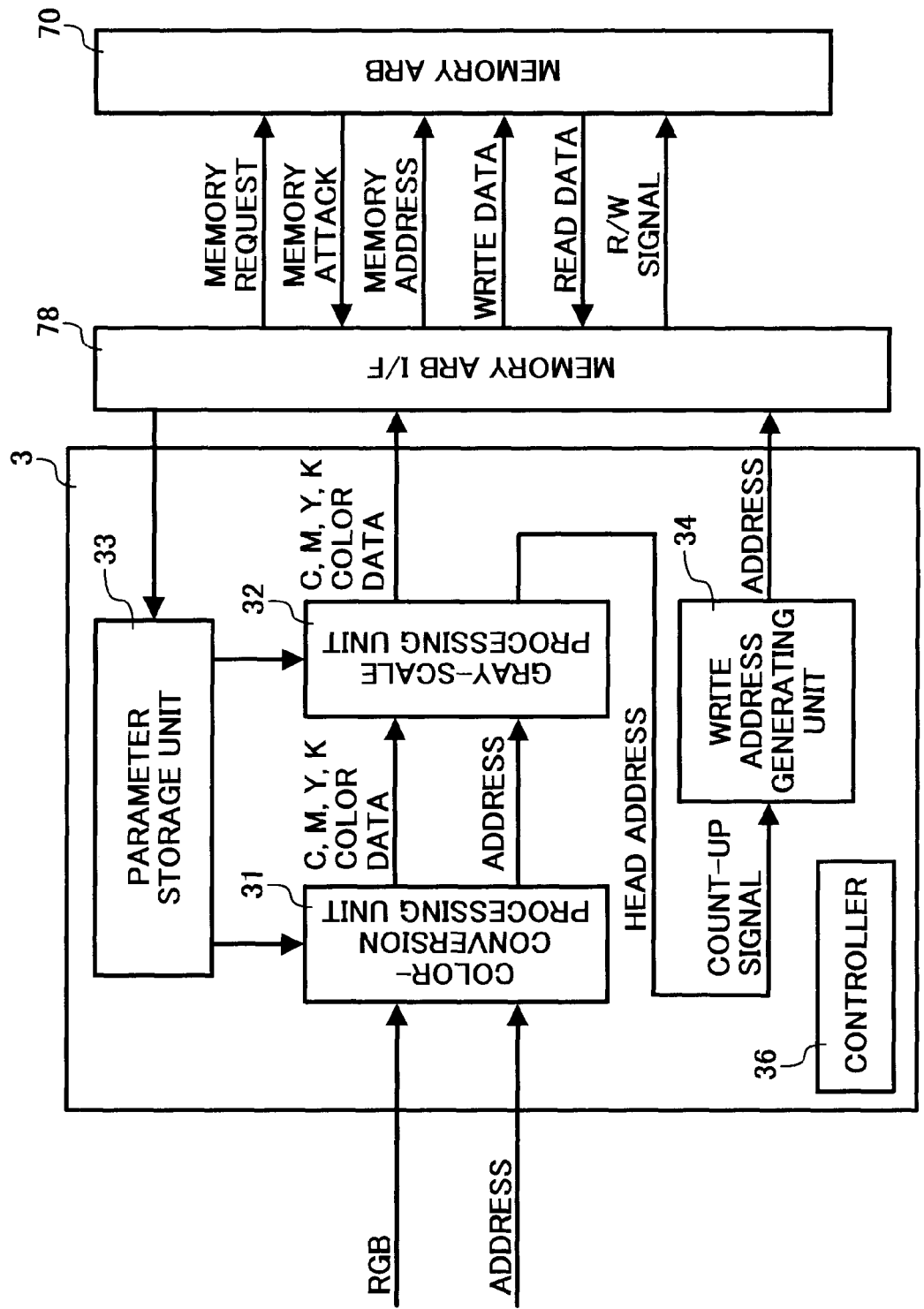
FIG. 24 is a block diagram of the image processing unit of the image forming apparatus according to the embodiment.

FIG. 24 is a block diagram of the image processing unit of the image forming apparatus according to the embodiment. The color converting unit 31 receives the color information (RGB) and an address on the band for each pixel from the rendering processing unit 1 for color conversion, and generates CMYK data for transfer to the gray-scale processing unit 32. The gray-scale processing unit 32 receives the CMYK values and addresses on the band from the color converting unit 31 for performing a gray-scale processing, and then transfers the result to the memory ARB I/F 78. A parameter storage unit 33 temporarily stores parameters of the color converting unit and the gray-scale processing unit.

A write address generating unit 34 generates addresses in the binary band memory area 72 for C, M, Y, and K colors of the main memory 7. The memory ARB I/F 78 interfaces with the memory ARB 70, and writes, based on the addresses from the write address generating unit 34, data after the gray-scale process in the main memory 7. A controller 36 controls the entirety of the image processing unit 3.

Figure 25:
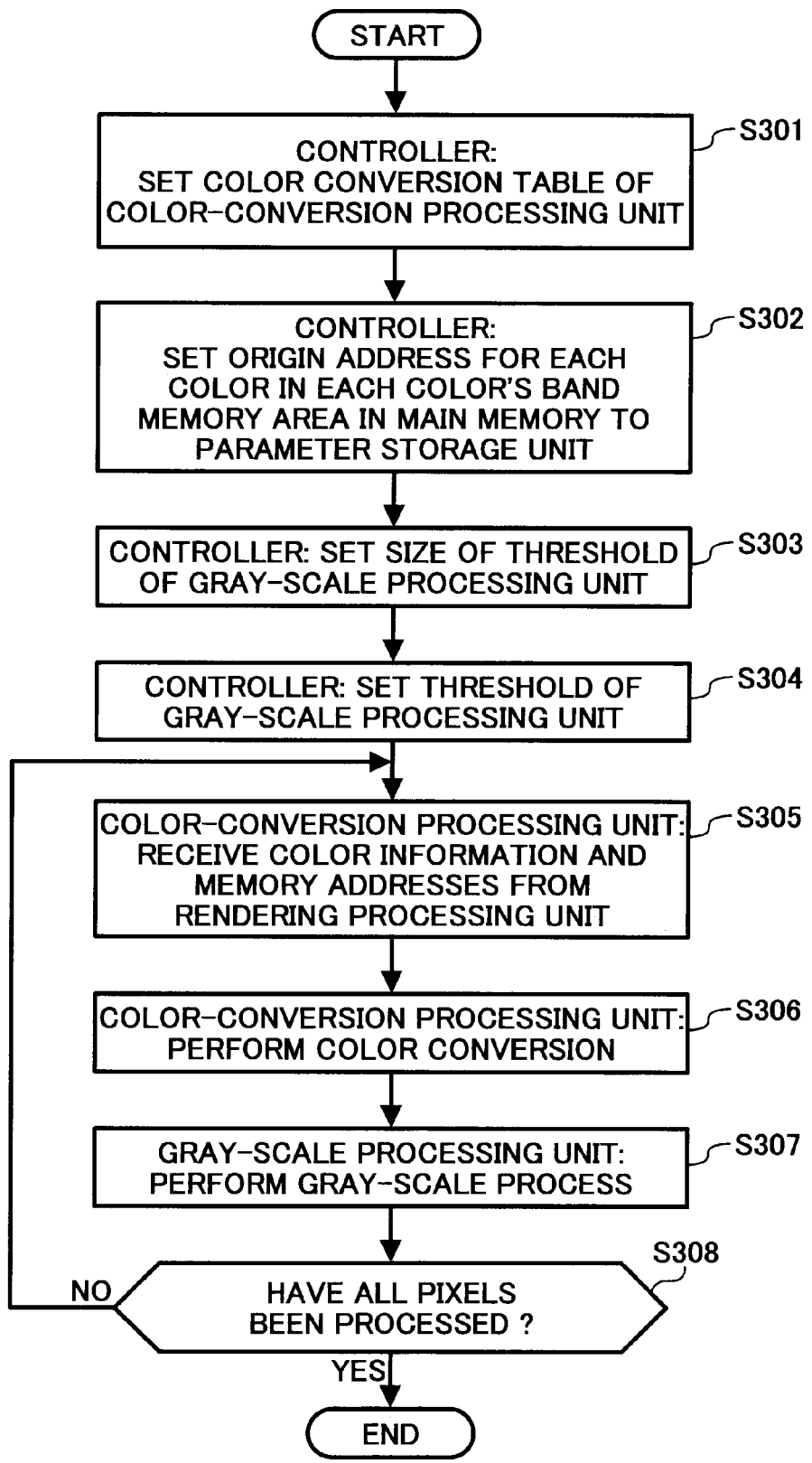
FIG. 25 is a flowchart of an image processing operation to be preformed in the image forming apparatus according to the embodiment.

FIG. 25 is a flowchart of an image processing operation to be preformed in the image forming apparatus according to the embodiment. The controller 36 sets a color conversion table of the color converting unit 31 (step S301). The controller 36 then sets an origin address for each color in each color's band memory area in the main memory to the parameter storage unit (step S302). The controller 36 then sets the size of a threshold in the gray-scale processing unit (step S303). The controller 36 then sets the threshold in the gray-scale processing unit (step S304).

The color converting unit 31 receives the color information and the memory address from the rendering processing unit 1 (step S305). The color converting unit 31 then performs color conversion (step S306). The gray-scale processing unit 32 then performs a gray-scale process (step S307). It is then determines whether all pixels have been processed (step S308). If it is determined as No (No at step S308), the procedure returns to step S305. If it is determined as Yes (Yes at step S308), the procedure ends.

Figure 26:
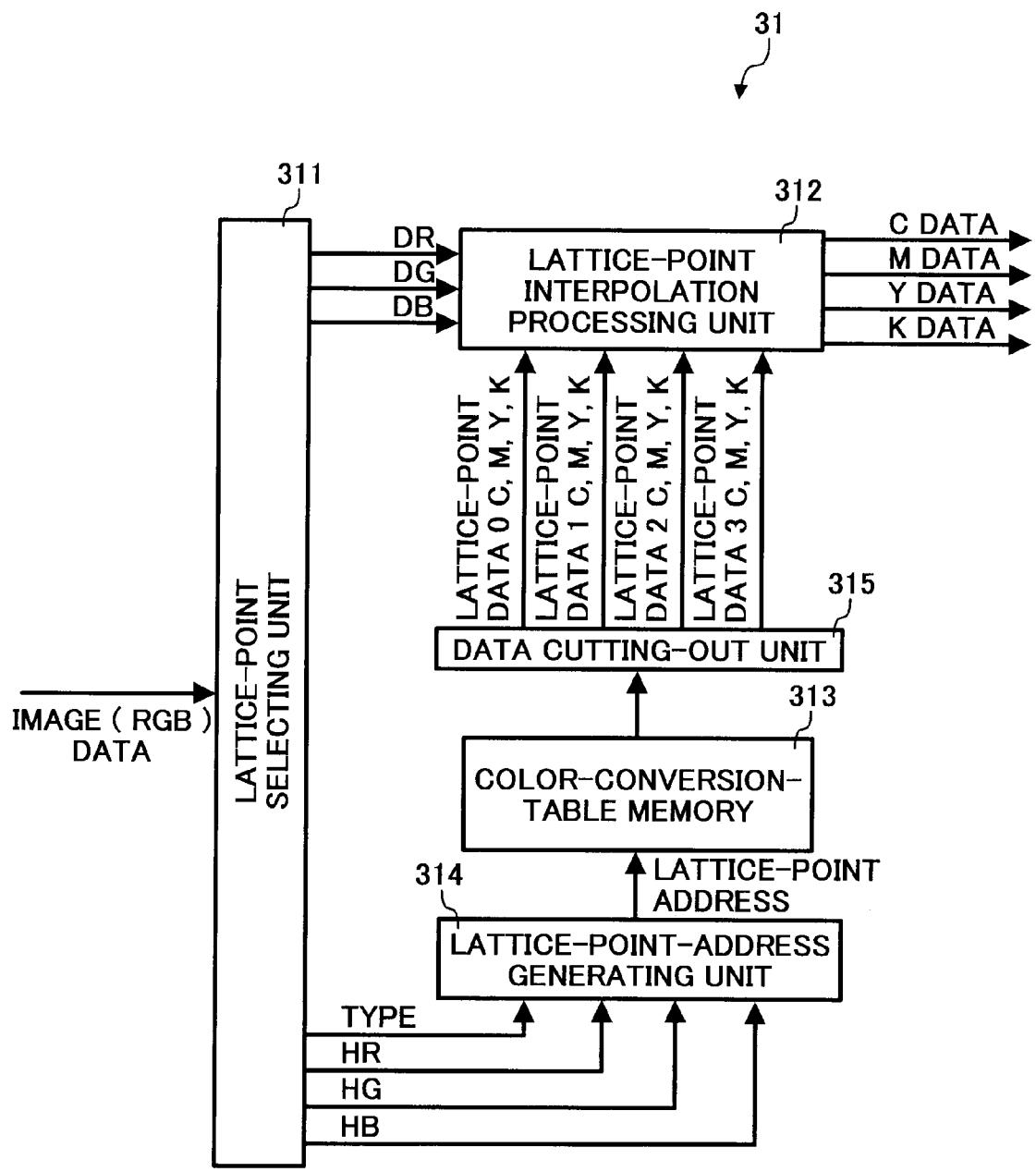
FIG. 26 is a block diagram of a color converting unit in the image processing unit.

FIG. 26 is a block diagram of the color converting unit in the image processing unit. A lattice-point selecting unit 311 receives image (RGB) data from the rendering processing unit 1, divides each of the R, G, and B components into upper N bits as HR, HG, and HB and lower (8-N) bits as DR, DG, and DB, respectively. Then, one of six tetrahedrons of a cube including eight lattice points that corresponds to the data is determined as TYPE, which is then transferred to a lattice-point address generating unit 314 and a lattice-point interpolation processing unit 312.

The lattice-point interpolation processing unit 312 interpolates the tetrahedron with DR, DG, and DB from the lattice-point selecting unit 311 based on the C, M, Y, and K values of the four points of the tetrahedron supplied from a data cutting-out unit 315 to find C, M, Y, and K data.

A color-conversion-table memory 313 stores lattice-point information in a format shown in FIG. 26, receives the addresses from the lattice-point address generating unit 314, and transfers the lattice-point information to the data cutting-out unit 315. The lattice-point address generating unit 314 finds a lattice-point address in an area of the color-conversion-table memory 313 from the HR, HG, HB, DR, DG, DB, and TYPE from the lattice-point selecting unit 311.

The data cutting-out unit 315 cuts out four parameters for allowing the lattice-point interpolation processing unit 312 to interpolate the lattice data received from the color-conversion-table memory 313.

Figure 27:
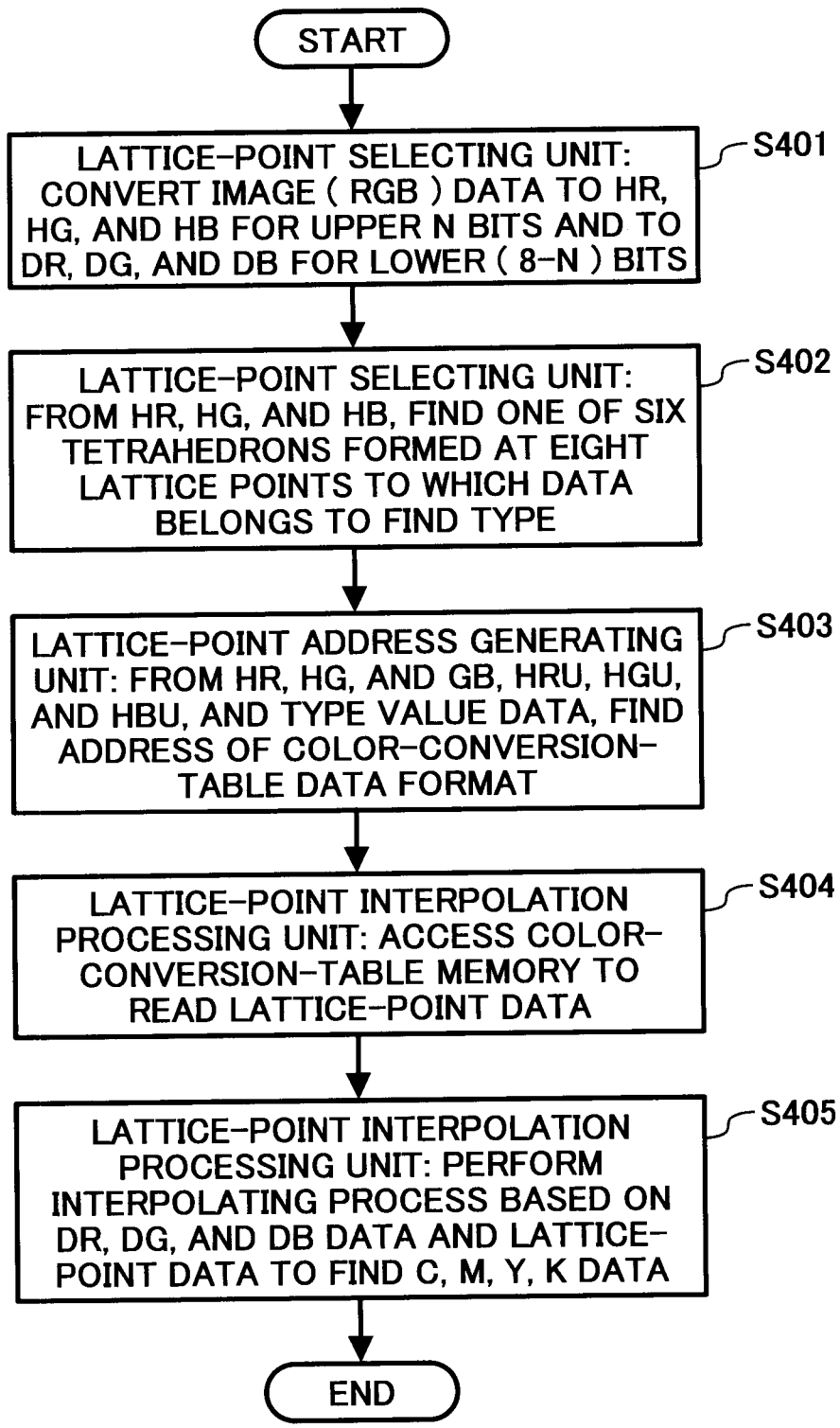
FIG. 27 is a flowchart of the operation of the color converting unit in the image processing unit.

FIG. 27 is a flowchart of the operation of the color converting unit in the image processing unit. The lattice-point selecting unit 311 converts the upper N bits of the input image (RGB) data to HR, HG, and HB and the lower (8-N) bits thereof to DR, DG, and DB (step S401). The lattice-point selecting unit 311 then finds TYPE from the found HR, HG, and HB (step S402). The lattice-point generating unit 314 then finds a lattice-point address (step S403).

The lattice-point interpolation processing unit 312 reads the lattice-point data from the color-conversion-table memory 313 (step S404), and then performs a process of interpolation of the lattice-point data by using the read lattice-point data to find C, M, Y, and K data (step S405).

Figure 28B:
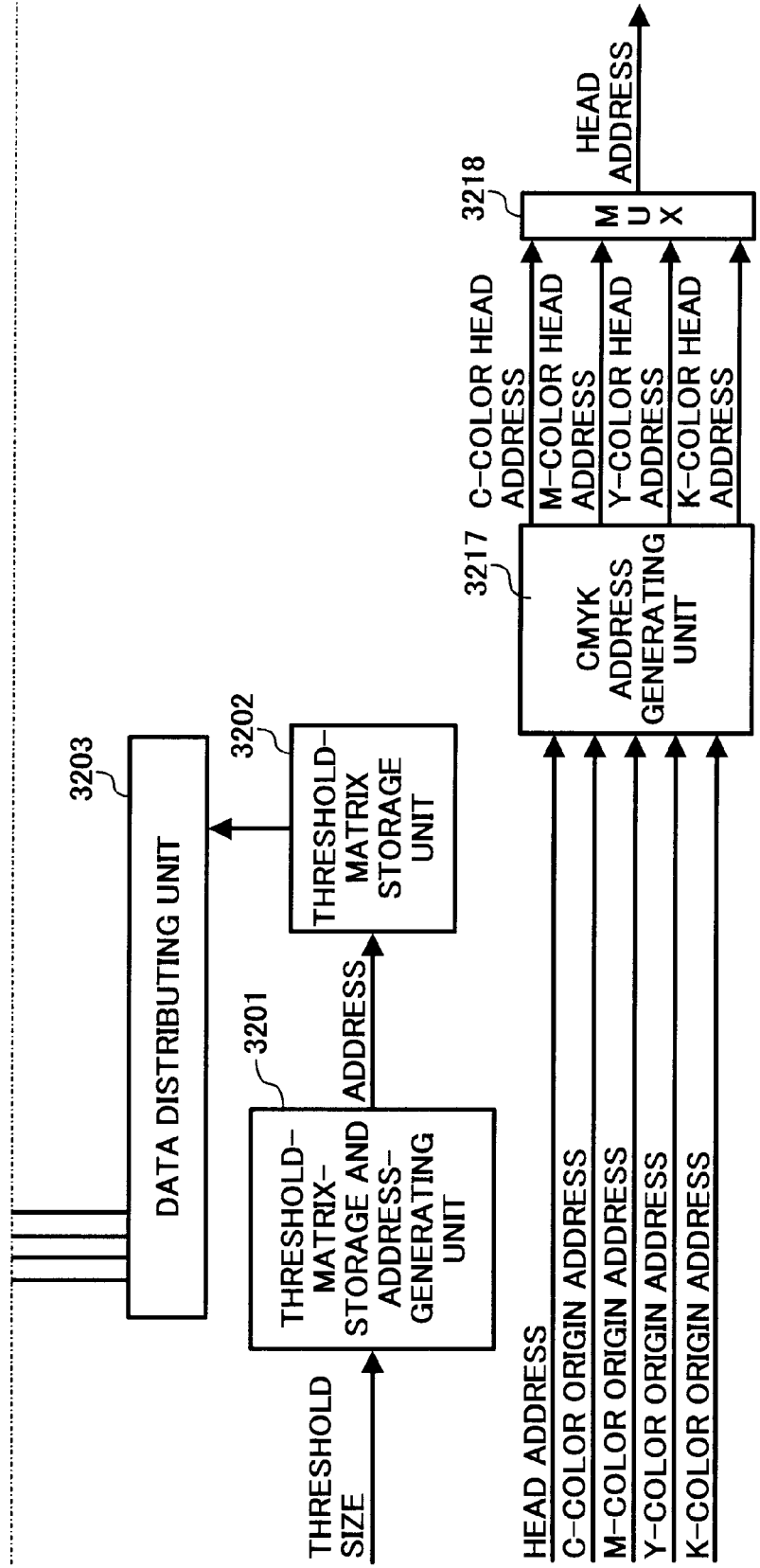
FIG. 28 is a block diagram of a gray-scale processing unit in the image processing unit.

FIG. 28 is a block diagram of a gray-scale processing unit in the image processing unit. A threshold-matrix-storage and address-generating unit 3201 receives the size of the threshold to generate an address of a threshold-matrix storage unit 3202. The threshold-matrix storage unit 3202 stores threshold matrices of various types. A data distributing unit 3203 receives thresholds for each of the C, M, Y, and K colors from the threshold-matrix storage unit 3202, and then distributes the thresholds to threshold comparing units 3204 through 3207 for the respective colors.

The comparing unit 3204 receives the threshold of C color from the data distributing unit 3203 and pixel data of C color from the color converting unit 31 (FIG. 24) for comparison, and then generates C-color data after the gray-scale process. The comparing unit 3205 receives the threshold of M color from the data distributing unit 3203 and pixel data of M color from the color converting unit 31 for comparison, and then generates M-color data after the gray-scale process. The comparing unit 3206 receives the threshold of Y color from the data distributing unit 3203 and pixel data of Y color from the color converting unit 31 for comparison, and then generates Y-color data after the gray-scale process. The comparing unit 3207 receives the threshold of K color from the data distributing unit 3203 and pixel data of K color from the color converting unit 31 for comparison, and then generates K-color data after the gray-scale process.

A fixed-length data generating unit 3208 sequentially receives C-color data after the gray-scale process from the comparing unit 3204 for conversion to fixed-length data. A fixed-length data generating unit 3209 sequentially receives M-color data after the gray-scale process from the comparing unit 3205 for conversion to fixed-length data. A fixed-length data generating unit 3210 sequentially receives Y-color data after the gray-scale process from the comparing unit 3206 for conversion to fixed-length data. A fixed-length data generating unit 3211 sequentially receives K-color data after the gray-scale process from the comparing unit 3207 for conversion to fixed-length data.

A FIFO 3212 receives data from the C-color fixed-length data generating unit 3208 for temporary storage. A FIFO 3213 receives data from the M-color fixed-length data generating unit 3209 for temporary storage. A FIFO 3214 receives data from the Y-color fixed-length data generating unit 3210 for temporary storage. A FIFO 3215 receives data from the K-color fixed-length data generating unit 3211 for temporary storage. A MUX 3216 receives data from each color's FIFO for sequential selection and then transfer to the memory ARB I/F 78.

A CMYK address generating unit 3217 adds an origin address of each color to a head address, which is a physical address from the color converting unit 31, to find a head address for each color, and then transfers the head address to the MUX 3218.

The MUX 3218 selects, from among the head addresses for the respective colors, a head address of the image data after the gray-scale process that is to be written in the main memory 7, and transfers the head address to the write address generating unit 34 (FIG. 24).

Figure 29:
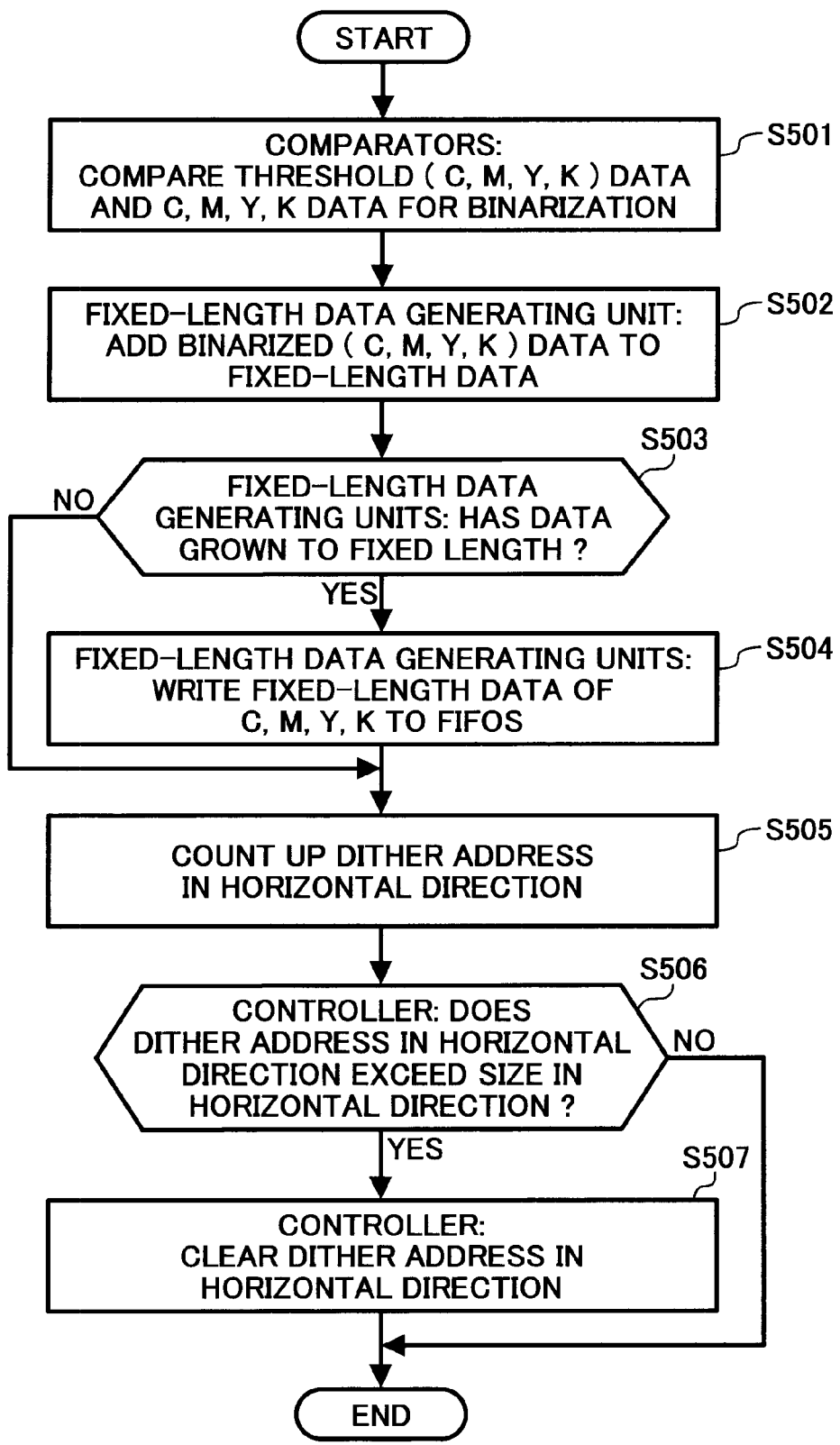
FIG. 29 is a flowchart of the operation of the gray-scale processing unit in the image processing unit.

FIG. 29 is a flowchart of the operation of the gray-scale processing unit in the image processing unit. The comparators 3204 through 3207 compares the relevant threshold (C, M, Y or K) data and the relevant C, M, Y, or K data for binarization (step S501). Then, the binarized (C, M, Y, and K) data is added to the fixed-length data (step S502). The fixed-length data generating units 3208 through 3211 each determine whether the data has grown to the fixed length (step S503). If the data has grown to the fixed length, the fixed data of C, M, Y, and K is written in the FIFOs (step S504), and a dither address is counted up in the horizontal direction (step S505). The controller 3219 then determines whether the dither address in the horizontal direction exceeds the size in the horizontal direction (step S506). If the dither address exceeds the size (Yes at step S506), the controller 3219 clears the dither address in the horizontal direction (step S507).

Figure 30:
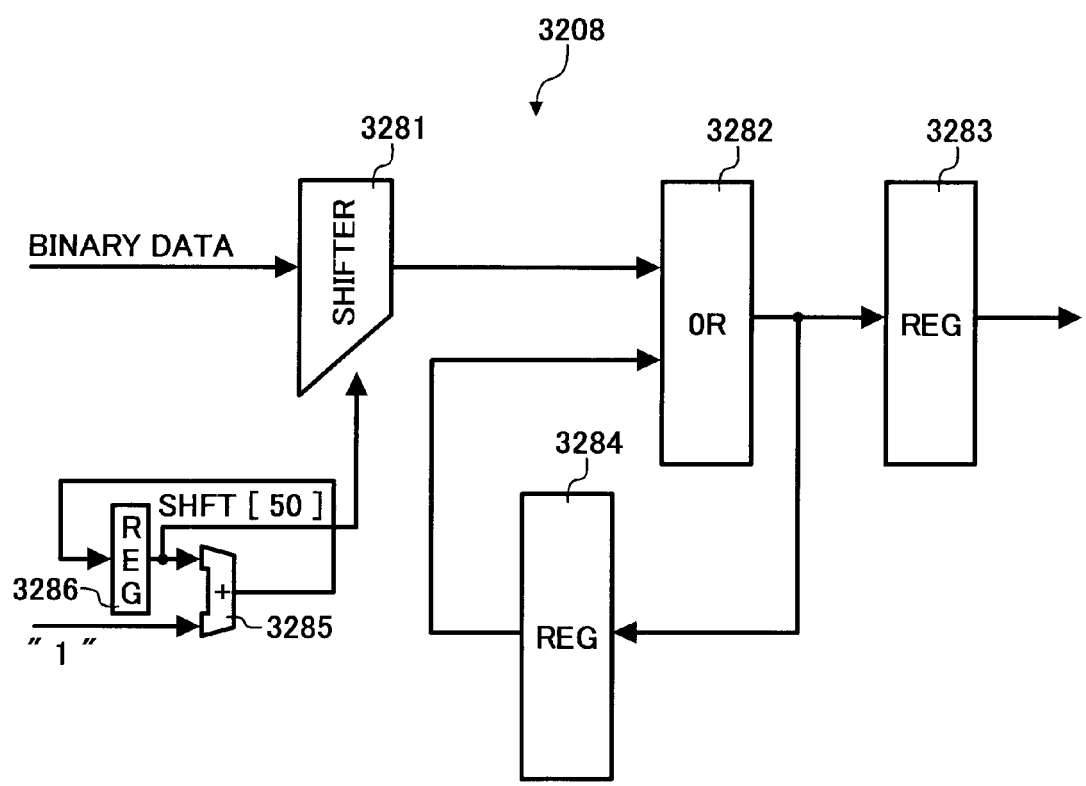
FIG. 30 is a block diagram of a fixed-length data generating unit in the image processing unit.

FIG. 30 is a block diagram of a fixed-length data generating unit in the image processing unit. A shifter 3281 receives binary data from the comparator 3204 (FIG. 28) to shift the data by a shift value stored in a register 3286 for transfer to an OR unit 3282. The OR unit 3282 performs an OR process on the binary data shifted by the shifter 3281 for output to a register 3284. The register 3284 stores the received binary data subjected to the OR process in the OR unit 3282. A register 3283 stores data reaching the fixed length.

An adder 3285 increments by "1" every time it receives binary data from the comparator 3204 (FIG. 28). The register 3286 stores the shift value.

Figure 31B:
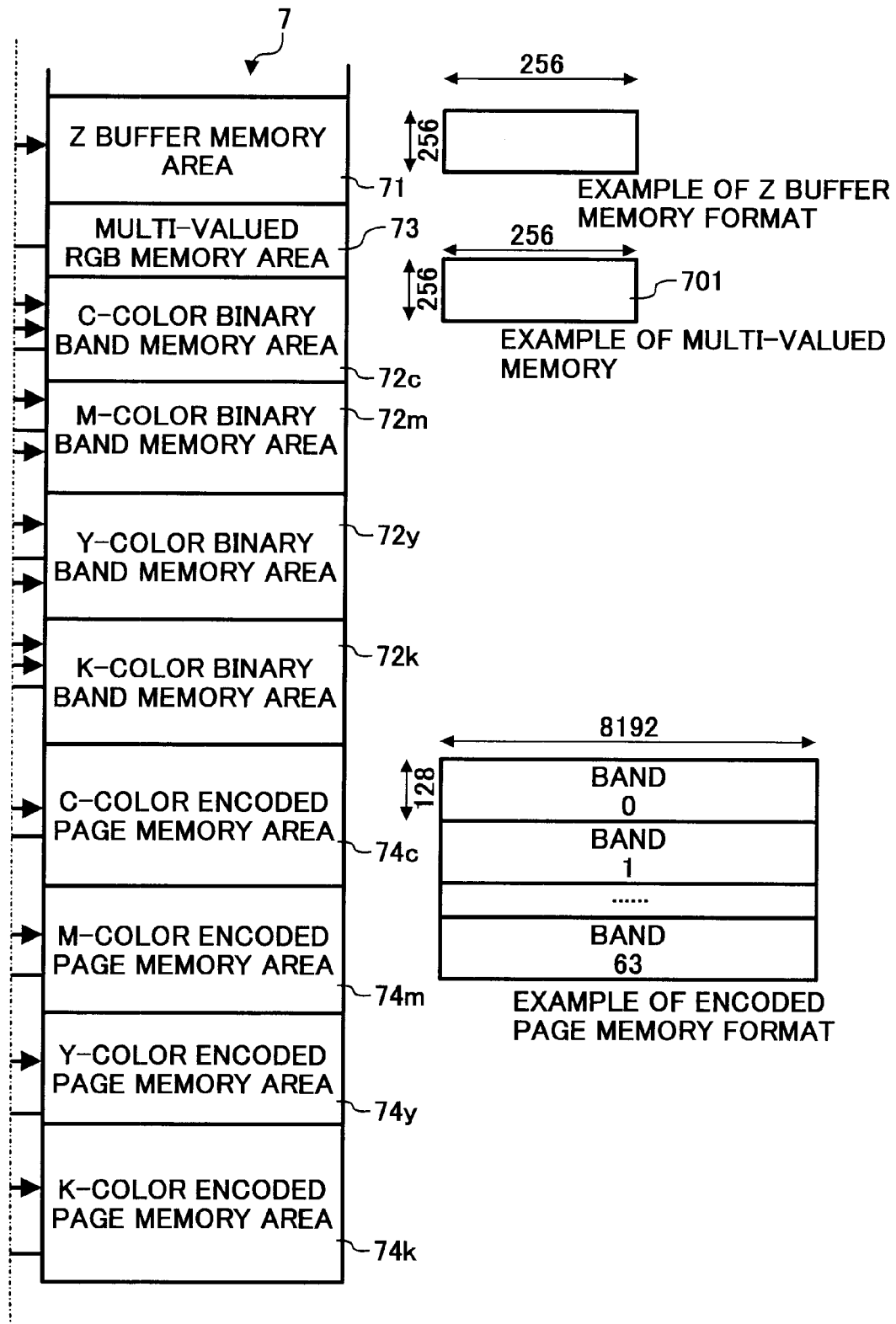
FIG. 31 is a diagram for explaining an exemplary modification of the image forming apparatus according to the embodiment.

FIG. 31 is a diagram for explaining an exemplary modification of the image forming apparatus according to the embodiment. FIG. 31 is different from FIG. 4 in that the memory 7 is provided with a multi-valued RGB memory area 73. With the multi-valued RGB memory area 73 being provided, the data subjected to the rendering process by the rendering processing unit 1 once retained in the multi-valued RGB memory area 73, and is then read therefrom by the image processing unit 3 for color conversion and a gray-scale process. After the gray-scale process, the data is rendered in the binary band memory areas. A multi-valued memory format 701 shown in FIG. 31 is an exemplary format in the multi-valued RGB memory.

Figure 32A:
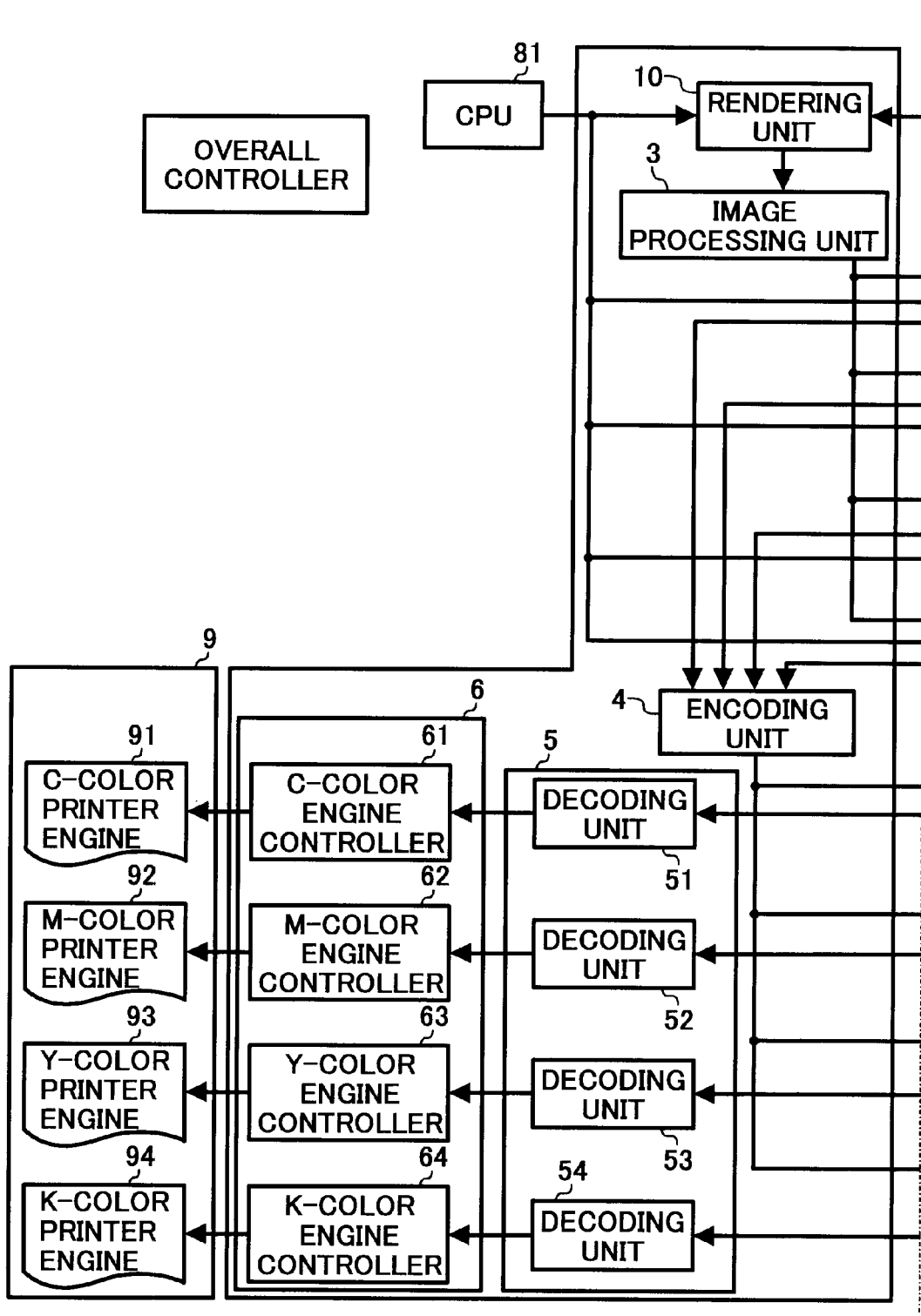
FIG. 32 is a diagram for explaining another exemplary modification of the image forming apparatus according to the embodiment.
Figure 32B:
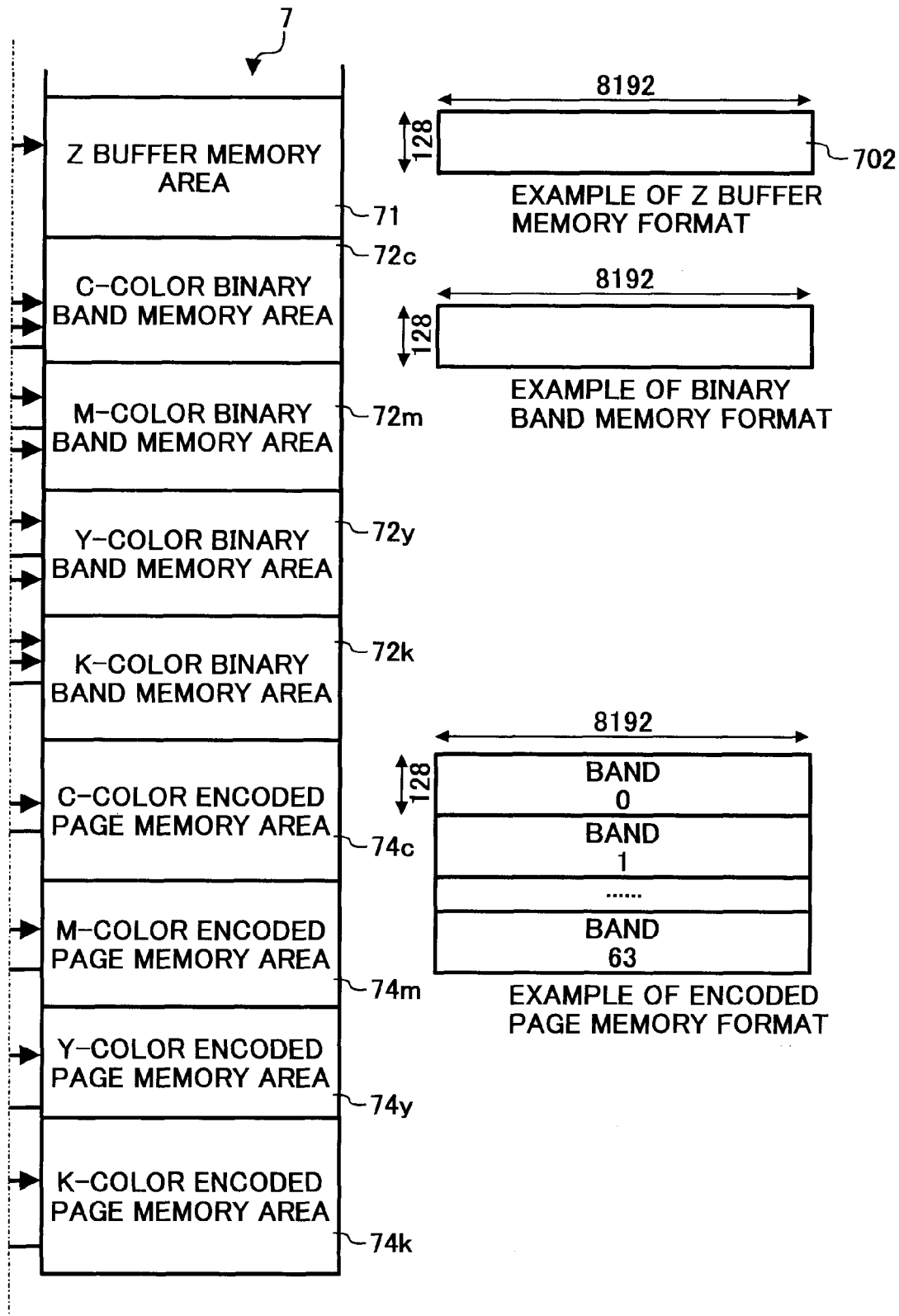

FIG. 32 is a diagram for explaining another exemplary modification of the image forming apparatus according to the embodiment. FIG. 32 is different from FIG. 4 in that the Z buffer memory storage area 71 in the memory 7 is structured to be used for each band. In FIG. 32, an example of a Z-buffer band memory format 702 is shown in which the memory 7 includes the Z buffer memory storage area 71 in which the rendering processing unit 1 writes data for each band.

In the above, an example of providing RGB color to each end point of a three-dimensional polygon for interpolation has been described. Similarly, CMY, CMYK, Lab, or the like will suffice. Also, even for monochrome graphics, the present invention can be achieved in consideration of the gray scale of one vector, not that of three vectors as for RGB.

Also, each end point of a three-dimensional polygon may be provided with X and Y addresses of a texture mapping pattern for interpolation, thereby achieving texture mapping.

Figure 33:
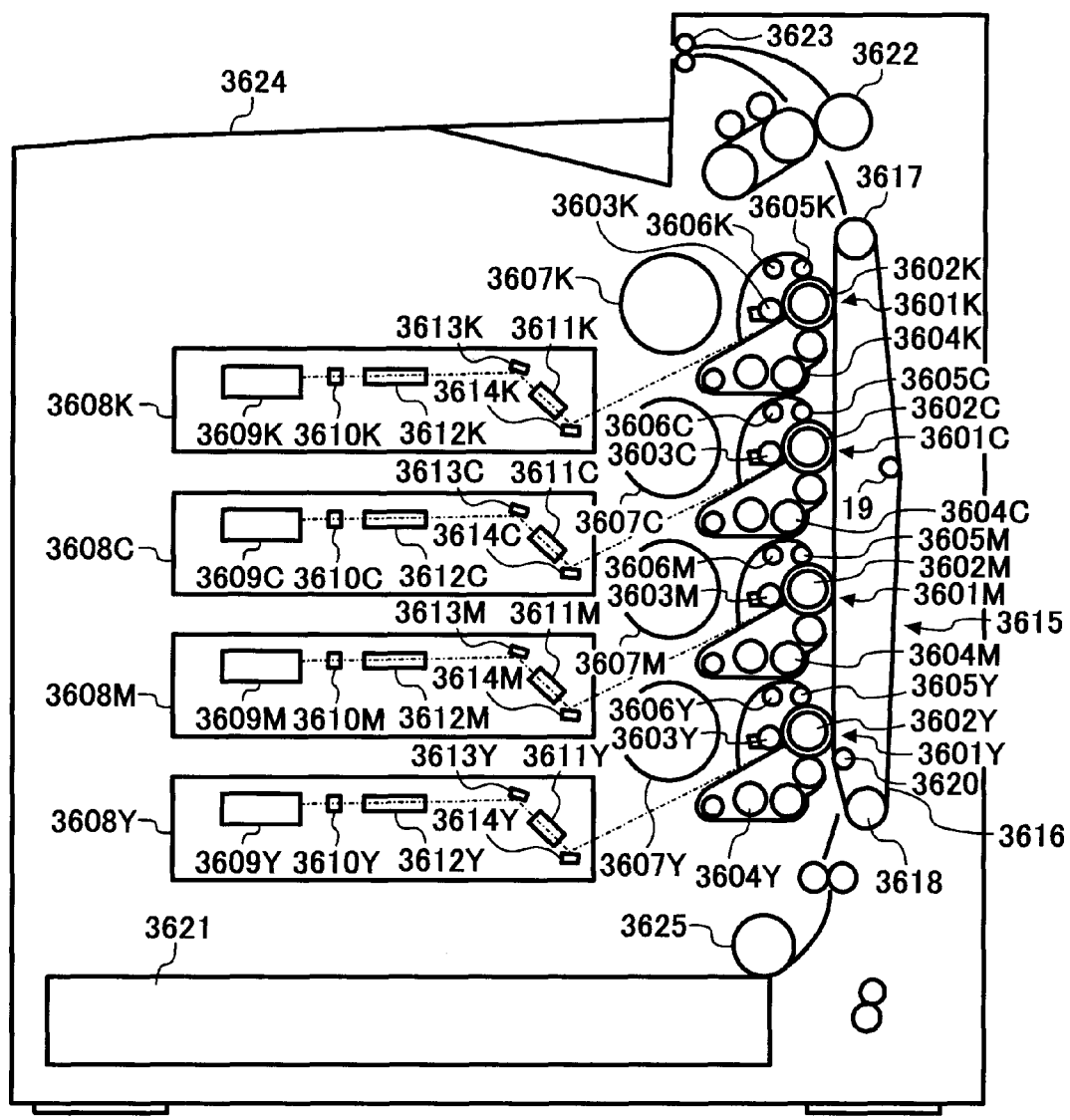
FIG. 33 is a diagram of an example in which the image forming apparatus according to the embodiment is applied to a color copying machine.
Figure 34A:
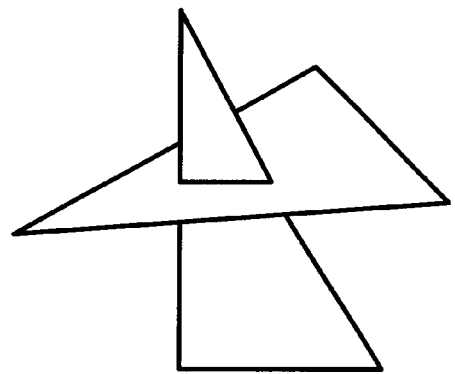
FIG. 34A is a diagram of an example in which a hidden-surface process is performed.
Figure 34B:
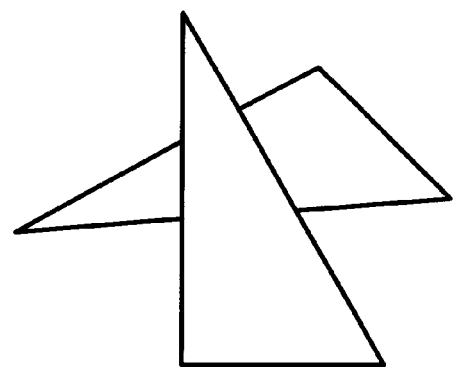
FIG. 34B is a diagram of an example in which a hidden-surface process is not performed.
Figure 34C:
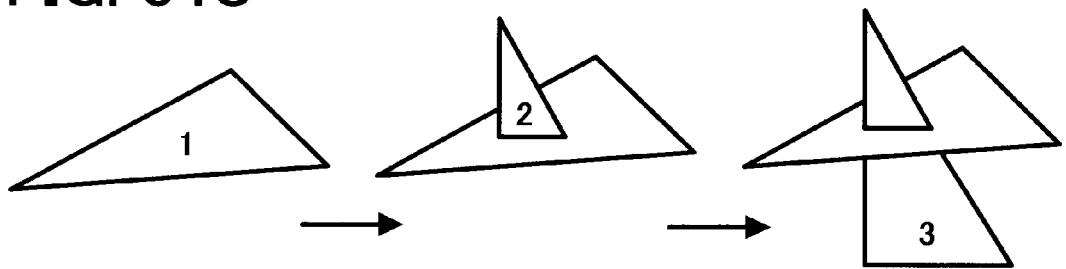
FIG. 34C is a diagram of an example in which rendering is performed without performing a hidden-surface process.
Figure 34D:
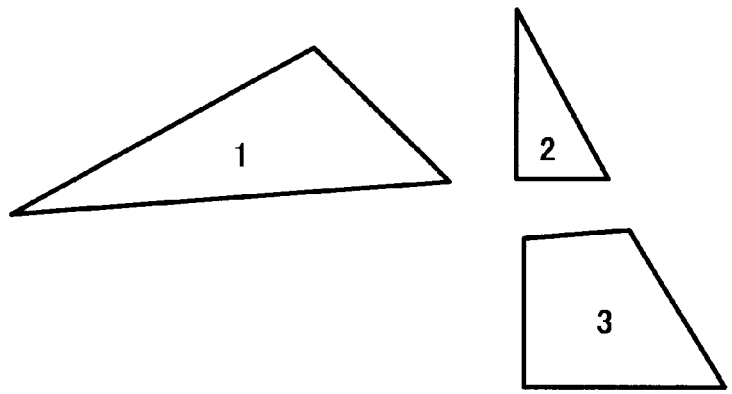
FIG. 34D is a diagram for explaining a rendering scheme without performing a hidden-surface process so that a stereoscopic positional relation between two triangles is made clear.

FIG. 33 is a diagram of an example in which the image forming apparatus according to the embodiment is applied to a color copying machine. This color printer is a four-drum, tandem-engine-type image forming apparatus in which images of four colors (Y, M, C, K) are formed by separate image forming systems 3601Y, 3601M, 3601C, and 3601K, and are then combined.

The image forming systems 3601Y, 3601M, 3601C, and 3601K include photoreceptors as image carriers, for example, organic photoreceptor (OPC) drums 3602Y, 3602M, 3602C, and 3602K, respectively, each having a small diameter. In these systems, the following components are disposed: charging rollers 3603Y, 3603M, 3603C, and 3603K as charging units to surround these OPC drums 3602Y, 3602M, 3602C, and 3602K, respectively, from the upstream of image forming; developing units 3604Y, 3604M, 3604C, and 3604K for developing electrostatic latent images on the OPC drums 3602Y, 3602M, 3602C, and 3602K, respectively, with a developer to obtain toner images of Y, M, C, and K colors; cleaning units 3605Y, 3605M, 3605C, and 3605K; static eliminating units 3606Y, 3606M, 3606C, and 3606K, etc.

Beside the developing units 3604Y, 3604M, 3604C, and 3604K, toner bottle units 3607Y, 3607M, 3607C, and 3607K are disposed for supplying a Y toner, an M toner, a C toner, and a K toner to the developing units 3604Y, 3604M, 3604C, and 3604K. Also, the image forming systems 3601Y, 3601M, 3601C, and 3601K are provided with separate optical writing units 3608Y, 3608M, 3608C, and 3608K, respectively. These optical writing units 3608Y, 3608M, 3608C, and 3608K include optical components, such as laser diode (LD) light sources 3609Y, 3609M, 3609C, and 3609K as laser light sources, collimate lenses 3610Y, 3610M, 3610C, and 3610K, and fθ lenses 3611Y, 3611M, 3611C, and 3611K; polygon mirrors 3612Y, 3612M, 3612C, and 3612K as deflective scanning units; reflecting mirrors 3613Y, 3613M, 3613C, 3613K, 3614Y, 3614M, 3614C, and 3614K; and other components, respectively.

The image forming systems 3601Y, 3601M, 3601C, and 3601K are vertically arranged. On their right side, a transfer belt unit 3615 is disposed to make contact with the OPC drums 3602Y, 3602M, 3602C, and 3602K, respectively. The transfer belt unit 3615 is extended over rollers 3617 through 3620 and is rotationally driven by a driving source not shown. The apparatus is provided at its lower portion with a paper feeding tray 3621 with transfer sheets as a transfer material accommodated therein. The apparatus is provided at its upper portion with a fixing unit 3622, a paper delivery roller 3623, and a paper delivery tray 3624.

At the time of image forming, in the image forming systems 3601Y, 3601M, 3601C, and 3601K, the OPC drums 3602Y, 3602M, 3602C, and 3602K are rotationally driven by the driving source not shown and are uniformly charged with the charging rollers 3603Y, 3603M, 3603C, and 3603K. Then, the optical writing units 3608Y, 3608M, 3608C, and 3608K optically writes in the OPC drums 3602Y, 3602M, 3602C, and 3602K based on the image data of the respective colors. With this, electrostatic latent images are formed on the OPC drums 3602Y, 3602M, 3602C, and 3602K.

These electrostatic latent images are formed on the OPC drums 3602Y, 3602M, 3602C, and 3602K are developed by the developing units 3604Y, 3604M, 3604C, and 3604K to form toner images of Y, M, C, K colors. On the other hand, a transfer sheet is supplied from the paper feeding tray 3621 to a paper feeding roller 3625, and is conveyed by a conveyor system vertically in the direction of the image forming systems 3601Y, 3601M, 3601C, and 3601K. This transfer sheet is electrostatically attached and held by a transfer belt 3616 and is conveyed by this transfer belt 3616. Further, with a transfer bias being applied by a transfer bias applying unit not shown, toner images of Y, M, C, and K colors on the OPC drums 3602Y, 3602M, 3602C, and 3602K are sequentially overlaid with each other for transfer. Thus, a full-color image is formed. The full-color image is then fixed to the transfer sheet by the fixing unit 3622. The transfer sheet is then delivered by the paper delivery roller 3623 to the paper delivery tray 3624.

In the image forming apparatus according to the present embodiment, the rendering processing unit provided to the image forming apparatus analyzes the rendering command in the image data, and then performs a rendering process on the image data through three-dimensional shape modeling. The hidden-surface processing unit then performs a hidden-surface process. The image processing unit then performs an image processing. Then, image output is performed by the printer engine. With this structure, the image forming apparatus receives three-dimensional graphic data for image output, and therefore the amount of data transferred to the image forming apparatus can be made small. Also, instead of image output as bit map data, images can be formed at the resolution of the image forming apparatus. Therefore, the output image quality can be increased. Furthermore, a three-dimensional rendering process is performed inside of the image forming apparatus. Therefore, a high-speed image process can be performed.

Also, the rendering processing unit calculates color information including gray-scale information at each vertex of the triangle and differentials in the x axis direction and the y axis direction with respect to the Z value information indicating coordinate values in the depth-direction axis with a point of intersection of the plane perpendicular to the y axis direction and one of two sides of the triangle as a start point. Then, by using the calculated differentials in the x and y directions, the rendering processing unit calculates color information and Z-value information at the calculated start point through interpolation. Then, by using the position information, color information, and Z-value information at the calculated start point and the calculated differentials, the rendering processing unit calculates position information including the Z-value information and color information at pixel points between the start point to another point of intersection of the plane and the other one of the sides of the triangle through interpolation. The hidden-surface processing unit then performs a hidden-surface process on the image data by using the Z values for the respective points calculated by the horizontal interpolating unit. With this structure, color information and depth information of a plurality of triangles to be rendered can be accurately and quickly interpolated. Then, with a hidden-surface process, image output can be achieved.

Furthermore, the rendering processing unit calculates a resolution from the position information of each vertex of the triangles and a tetragon surrounding each of the triangles being divided by the minimum color length in the x axis and the minimum color length in the y axis. With the calculated resolution, the amount of change in the color information in color interpolation in the x axis direction and the y axis direction is controlled. The changing resolution (mesh) is found from the minimum color length in the vertical direction of the specified tetragon and the minimum color length in the horizontal direction thereof, thereby allowing the color information correcting unit to control a color change in color interpolation in the horizontal and vertical directions. Thus, even in an image forming apparatus that is generally low in gray scale, halftone can be clearly output.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus that analyzes a rendering command in image data, performs a rendering process on the image data based on a three-dimensional shape modeling, and prints the image data to which the rendering process is performed using a printer engine, comprising:
   a rendering processing unit configured to represent position information of each vertex of a plurality of triangles forming a figure in first image data with coordinate values in a first axis in a depth direction, a second axis in a first direction perpendicular to the first axis, and a third axis in a second direction perpendicular to both the first axis and the second axis, to obtain the position information and color information on each vertex of the triangles, and to perform the rendering process on the first image data to produce second image data;
   a hidden-surface processing unit configured to perform a hidden-surface process on the second image data to produce third image data;
   an image processing unit configured to perform an image process on the third image data; and
   the printer engine configured to print the processed third image data,
   wherein the rendering processing unit includes a color-information correcting unit that calculates an update signal from the position information of the vertex of each triangle by dividing a tetragon surrounding each triangle by a minimum color length in either of the second axis and the third axis and a minimum color length in the other axis.

2. The image forming apparatus according to claim 1, wherein the hidden-surface processing unit includes a Z-buffer storage unit that stores a Z value that is a coordinate value in the first axis corresponding to a pixel of the second image data.

3. The image forming apparatus according to claim 1, wherein the image processing unit includes an image-processing-data storage unit that stores the third image data.

4. The image forming apparatus according to claim 1, wherein
the rendering processing unit includes
a pre-rendering processing unit that calculates a first differential in the first direction and a second differential in the second direction with respect to color information including gray-scale information at each vertex of the triangles and Z-value information that represents a coordinate value in the first axis;
a rendering-start-point calculating unit that calculates a point of intersection of a plane perpendicular to the second axis and one of two sides of the triangles as a start point, and calculates color information and Z-value information at the start point by using the first differential and the second differential through interpolation; and
a horizontal interpolating unit that calculates position information and color information including Z-value information at each point between the start point to a point of intersection of the plane and another side of the triangles by using position information of the start point, the color information and the Z-value information, and the first and the second differentials through interpolation, and
the hidden-surface processing unit performs the hidden-surface process on the second image data by using the Z-value information at each point calculated by the horizontal interpolating unit.

5. The image forming apparatus according to claim 4, wherein the pre-rendering processing unit calculates the first differential and the second differential in parallel for each color vector with respect to the color information including the gray-scale information at each vertex of the triangles.

6. The image forming apparatus according to claim 4, wherein the rendering-start-point calculating unit includes
a position interpolating unit that calculates a position of the start point on one side of the triangle by using a direction axis selected from the second axis and the third axis through interpolation;
a color-information interpolating unit that calculates color information at the position of the start point using the direction axis selected through interpolation; and
a Z-value-information interpolating unit that calculates Z-value information at the position of the start point using the direction axis selected through interpolation.

7. The image forming apparatus according to claim 4, wherein the horizontal interpolating unit interpolates the color information including the gray-scale information calculated by the rendering-start-point calculating unit in parallel for each color vector.

8. The image forming apparatus according to claim 1, wherein the image processing unit includes a color converting unit that converts color information of the second image data.

9. The image forming apparatus according to claim 8, wherein the image processing unit further includes a gray-scale processing unit that performs a gray-scale processing on the color information of the image data color-converted by the color converting unit.

10. The image forming apparatus according to claim 9, wherein the gray-scale processing unit includes
a fixed-length-data generating unit that converts the color information to which the gray-scale process is performed into a word length; and
a data storage unit that stores the color information converted into the word length by the fixed-length data generating unit.

11. The image forming apparatus according to claim 2, wherein the Z-buffer storage unit stores the image data for each band data.

12. The image forming apparatus according to claim 1, wherein the rendering processing unit controls an amount of change of the color information caused by color interpolation in the first direction and the second direction by using the calculated update signal.

13. An image forming method that analyzes a rendering command in image data, performs a rendering process on the image data based on a three-dimensional shape modeling, and prints the image data to which the rendering process is performed using a printer engine, comprising:
obtaining position information of each vertex of a plurality of triangles forming a figure in first image data with coordinate values in a first axis in a depth direction, a second axis in a first direction perpendicular to the first axis, and a third axis in a second direction perpendicular to both the first axis and the second axis;
performing a rendering process on the first image data to produce second image data, wherein the rendering process includes calculating an update signal from the position information of the vertex of each triangle by dividing a tetragon surrounding each triangle by a minimum color length in either of the second axis and the third axis and a minimum color length in the other axis;
performing a hidden-surface process on the second image data to produce third image data;
performing an image process on the third image data; and
printing the processed third image data.

14. A computer-readable medium storing a computer program for realizing an image forming method that analyzes a rendering command in image data, performs a rendering process on the image data based on a three-dimensional shape modeling, and prints the image data to which the rendering process is performed using a printer engine on a computer, the computer program making a computer execute the steps of:
obtaining position information of each vertex of a plurality of triangles forming a figure in a first image data with coordinate values in a first axis in a depth direction, a second axis in a first direction perpendicular to the first axis, and a third axis in a second direction perpendicular to both the first axis and the second axis;
performing a rendering process on the first image data to produce second image data, wherein the rendering process includes calculating an update signal from the position information of the vertex of each triangle by dividing a tetragon surrounding each triangle by a minimum color length in either of the second axis and the third axis and a minimum color length in the other axis;
performing a hidden-surface process on the second image data to produce third image data;
performing an image process on the third image data; and
printing the processed third image data.

* * * * *